US012812383B2

(12) United States Patent
Rohini et al.

(10) Patent No.: US 12,812,383 B2
(45) Date of Patent: Nov. 24, 2026

(54) METHOD AND APPARATUS FOR HANDLING SECURITY POLICIES IN V2X COMMUNICATION SYSTEM

(71) Applicant: Samsung Electronics Co., Ltd., Suwon-si (KR)

(72) Inventors: R Rohini, Bangalore (IN); Rajavelsamy Rajadurai, Bangalore (IN); Nivedya Parambath Sasi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/437,183

(22) Filed: Feb. 8, 2024

(65) Prior Publication Data

US 2024/0179531 A1 May 30, 2024

Related U.S. Application Data

(63) Continuation of application No. 17/176,627, filed on Feb. 16, 2021, now Pat. No. 11,902,787.

(30) Foreign Application Priority Data

Feb. 17, 2020 (IN) ............................. 202041006723
Jan. 27, 2021 (IN) ............................. 202041006723

(51) Int. Cl.
*H04W 12/37* (2021.01)
*H04W 4/40* (2018.01)
(Continued)

(52) U.S. Cl.
CPC ............. *H04W 12/37* (2021.01); *H04W 4/40* (2018.02); *H04W 12/50* (2021.01); *H04W 76/14* (2018.02)

(58) Field of Classification Search
CPC ....... H04W 12/37; H04W 4/40; H04W 12/50; H04W 76/14; H04W 12/106; H04W 92/18
See application file for complete search history.

(56) References Cited

U.S. PATENT DOCUMENTS

2017/0164165 A1* 6/2017 Negalaguli ......... H04W 12/033
2018/0242115 A1 8/2018 Kim et al.
(Continued)

FOREIGN PATENT DOCUMENTS

KR 10-2019-0102068 A 9/2019
KR 10-2019-0126855 A 11/2019
WO 2018128505 A1 7/2018

OTHER PUBLICATIONS

International Search Report and Written Opinion of the International Searching Authority in connection with International Application No. PCT/KR2021/001948 issued Jun. 1, 2021, 10 pages.
(Continued)

*Primary Examiner* — Mazda Sabouri

(57) ABSTRACT

A method performed by a first terminal performing vehicle-to-everything (V2X) communication with a second terminal via one or more PC5 unicast links in a wireless communication system is provided. The method may include: receiving, from a core network entity, information on one or more security policies respectively corresponding to the one or more PC5 unicast links, wherein each of the one or more PC5 unicast links is associated with one or more V2X services; transmitting, to the second terminal, a direct communication request message including the one or more security policies for initiating the V2X communication; and in case that the transmitted direct communication request message is accepted by the second terminal, activating a
(Continued)

security of each of the one or more PC5 unicast links based on the received information on the one or more security policies.

8 Claims, 21 Drawing Sheets

(51) Int. Cl.
*H04W 12/50* (2021.01)
*H04W 76/14* (2018.01)

(56) References Cited

U.S. PATENT DOCUMENTS

| | | | |
|---|---|---|---|
| 2018/0255499 A1 | 9/2018 | Loehr et al. | |
| 2019/0014469 A1* | 1/2019 | Dees | H04L 63/162 |
| 2020/0015304 A1 | 1/2020 | Ma | |
| 2020/0100088 A1 | 3/2020 | Kim et al. | |
| 2020/0221298 A1* | 7/2020 | Pan | H04W 12/50 |
| 2021/0144727 A1 | 5/2021 | Pan et al. | |
| 2021/0160939 A1 | 5/2021 | Pan et al. | |
| 2021/0273923 A1 | 9/2021 | Zhang et al. | |
| 2022/0132307 A1* | 4/2022 | Perras | H04W 4/40 |
| 2022/0174481 A1* | 6/2022 | Perras | H04L 63/045 |

OTHER PUBLICATIONS

Qualcomm Incorporated, “Adding the provisioning of security policy to solution #16”, 3GPP TSG SA WG3 (Security) Meeting #97, S3-194302, Nov. 18-22, 2019, Reno (US), 2 pages.

Huawei et al., “eV2X: Solution for the UP security activation policy handling in NR PC5 unicast”, 3GPP TSG-SA WG3 Meeting #97, S3-194175, Reno (US), Nov. 18-22, 2019, 2 pages.

Vivo Mobile Communication Co., Ltd., “unicast overview modification”, 3GPP TSG-SA2 Meeting #135, S2-1909871, Split, Croatia, Oct. 14, 2019-Oct. 18, 2019, 4 pages.

Huawei et al., “eV2X: Solution for the UP security activation policy handling in NR PC5 unicast”, 3GPP TSG-SA WG3 Meeting #97, S3-194648, Reno (US), Nov. 18-22, 2019, 2 pages.

Apple, “pCR: Security policy for unicast message in PC5”, 3GPP TSG-SA WG3 E-Meeting #98bis-e, Apr. 14-17, 2020, S3-200824, 4 pages.

Supplementary European Search Report dated Dec. 5, 2022 in connection with European Patent Application No. 21 75 7486, 11 pages.

China National Intellectual Property Administration, “The First Office Action,” issued May 7, 2023, in connection with Chinese Patent Application No. 202180014649.7, 13 pages.

Office Action dated Oct. 30, 2023, in connection with European Patent Application No. 21757486.2, 7 pages.

Office Action dated Jan. 26, 2024, in connection with Korean Patent Application No. 10-2022-7020951, 14 pages.

Summons to attend Oral Proceedings dated May 31, 2024, in connection with European Patent Application No. 21757486.2, 8 pages.

Notice of Allowance issued Sep. 6, 2024, in connection with Korean Patent Application No. 10-2022-7020951, 11 pages.

Brief Communication issued Oct. 16, 2024, in connection with European Patent Application No. 21757486.2, 3 pages.

Communication under Rule 71(3) EPC issued Nov. 11, 2024, in connection with European Patent Application No. 21757486.2, 62 pages.

* cited by examiner

METHOD AND APPARATUS FOR HANDLING SECURITY POLICIES IN V2X COMMUNICATION SYSTEM

CROSS REFERENCE TO RELATED APPLICATION

This application is continuation application of application Ser. No. 17/176,627 filed on Feb. 16, 2021, now U.S. Pat. No. 11,902,787, which is related to and claims the benefit of Indian Provisional Application No. 202041006723 filed on Feb. 17, 2020, and Indian Application No. 202041006723 filed on Jan. 27, 2021, the disclosures of which are herein incorporated by reference in their entirety.

BACKGROUND

1. Field

The present disclosure relates to the field of device to device (D2D) communications and more particularly to handling security policies in a Vehicle-to-Everything (V2X) communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IOT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In accordance with an embodiment of the present disclosure, a method performed by a first terminal performing vehicle-to-everything (V2X) communication with a second terminal via one or more PC5 unicast links in a wireless communication system is provided. The method may comprise: receiving, from a core network entity, information on one or more security policies respectively corresponding to the one or more PC5 unicast links, wherein each of the one or more PC5 unicast links is associated with one or more V2X services; transmitting, to the second terminal, a direct communication request message including the one or more security policies for initiating the V2X communication; and in case that the transmitted direct communication request message is accepted by the second terminal, activating a security of each of the one or more PC5 unicast links based on the received information on the one or more security policies.

In accordance with an embodiment of the present disclosure, a first terminal for performing vehicle-to-everything (V2X) communication with a second terminal via one or more PC5 unicast links in a wireless communication system is provided. The first terminal may comprise: a transceiver; and at least one processor configured to: receive, from a core network entity via the transceiver, information on one or more security policies respectively corresponding to the one or more PC5 unicast links, wherein each of the one or more PC5 unicast links is associated with one or more V2X services; transmit, to the second terminal via the transceiver, a direct communication request message including the one or more security policies for initiating the V2X communication; and in case that the transmitted direct communication request message is accepted by the second terminal, activate a security of each of the one or more PC5 unicast links based on the received information on the one or more security policies.

In accordance with an embodiment of the present disclosure, a method performed by a second terminal performing vehicle-to-everything (V2X) communication with a first terminal via one or more PC5 links in a wireless communication system is provided. The method may comprise: receiving, from a first terminal a direct communication request message including one or more security policies respectively corresponding to the one or more PC5 unicast links for initiating the V2X communication, wherein each of the one or more PC5 unicast links is associated with one or more V2X services; determining whether the received direct communication request message is acceptable based on the one or more security policies included in the transmitted communication message and one or more security policies associated with the second terminal; and in case that the transmitted direct communication request message is acceptable, activating a security of each of the one or more PC5 unicast links based on the received direct communication request message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
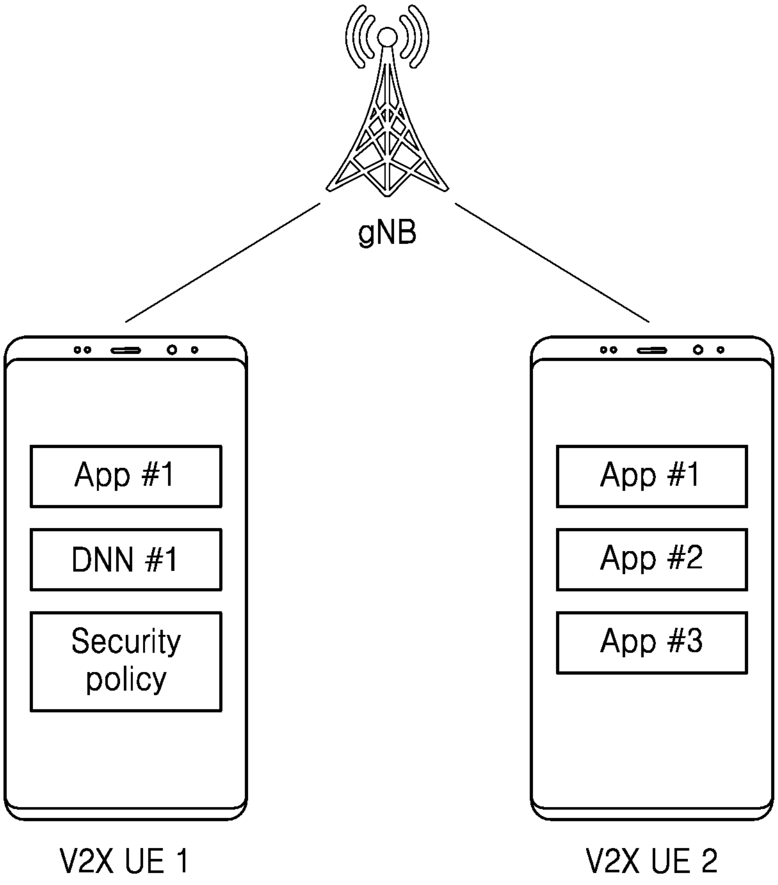
FIG. 1A illustrates overview of a V2X communication between UE1 and UE2.

FIGS. 1*a* through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IOT devices, sensors, and other wireless communication devices.

According to 3GPP Release-16, there are two modes of operation for Vehicle-to-Everything (V2X) communication namely V2X communication over PC5 reference point/interface (for direct mode of communication) and V2X communication over Uu reference point/interface (for indirect mode of communication). The UE (vehicle UE) may initiate communication with the other UE over the PC5 interface or the Uu interface for exchanging user plane data. The user plane data exchanged over the PC5 interface or the Uu interface has to be protected using User Plane (UP)

security policy. The UP security policy includes the indication of UP confidentiality protection and UP integrity protection.

Defining the UP security policy involves defining whether the UP confidentiality/integration protection is "required" or "not needed" for the V2X communication between the UEs over the PC5 interface and the Uu interface.

FIG. 1A illustrates overview of a V2X communication between UE1 and UE2.

Consider an example scenario, as depicted in FIG. 1A, wherein a UE 1 (supporting the V2X communication) wants to initiate a V2X communication with the UE2 for communicating the user plane data corresponding to an application 1 (App #1) supported by a Data Network Name 1 (DNN1) over the Uu interface.

For the V2X communication over the Uu interface, a gNodeB (gNB) defines an on-demand UP security policy to support flexibility in the user plane data protection according to the DNN, or Network Slice Selection Assistance Information (NSSAI) and communicates the defined UP security policy to the UE1 through an established Protocol Data Unit (PDU) session. However, such a UP security policy may be negotiated for all data bearers (DRBs) of the PDU session at the time of Application Server (AS) security context setup. For each DRB, whether the UP confidentiality/integrity protection "required" or "not needed" may be defined based on the UP security policy.

Figure 1B:
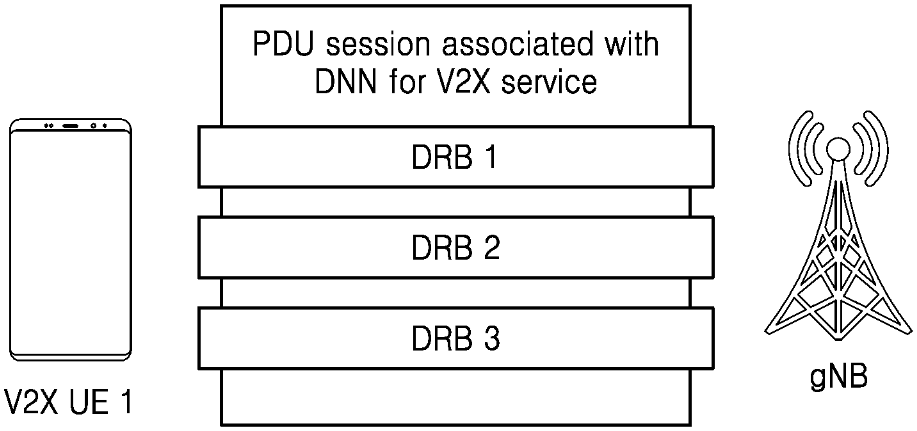
FIG. 1B illustrates a process for establishing a PDU session for V2X.

FIG. 1B illustrates a process for establishing a PDU session for V2X.

For example, consider that the UP security policy for the established PDU session may be defined as follows:

App #1 PDU session security_policy of the DNN1=>{confidentiality—"required", integrity—"required"}

Further, when the UE1 wants to initiate the V2X communication with the UE2 for communicating the user plane data corresponding to an application 2 (App #2) supported by the same DNN1, the same UP security policy defined for the application 1 may be applied for the application 2, as the DNN is same. However, the UP security protection may not be required for all the applications present in the UE. Thus, defining the UP security policy for protecting the user plane data corresponding to each application may result in unnecessary consumption of resource of energy.

Figure 1C:
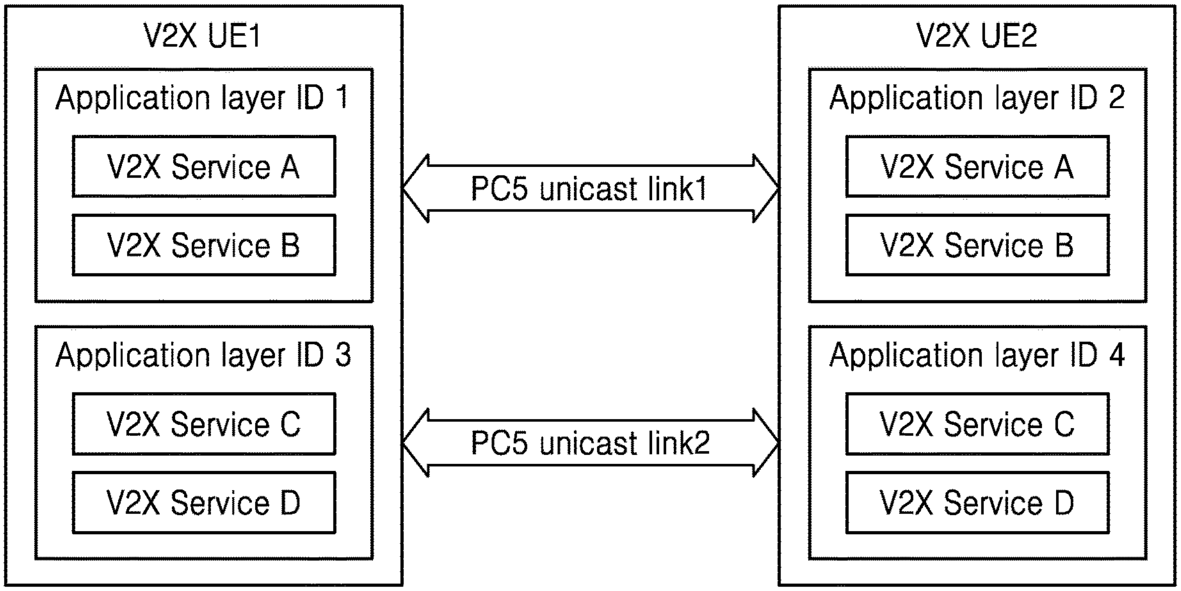
FIG. 1C illustrates a process for establishing the PC5 link for each application with multiple services.

FIG. 1C illustrates a process for establishing the PC5 link for each application with multiple services.

Further, in an example scenario of one-to-one communication between the UE1 and the UE2 supporting the App #1 and the App #2, each application (with multiple services on an application) has to establish different unicast PC5 links (for example; a unicast PC5 link1, and a unicast PC5 link2). All V2X services corresponding to the applications in the UE using the same PC5 unicast link uses a same Application Layer ID.

Figure 1D:
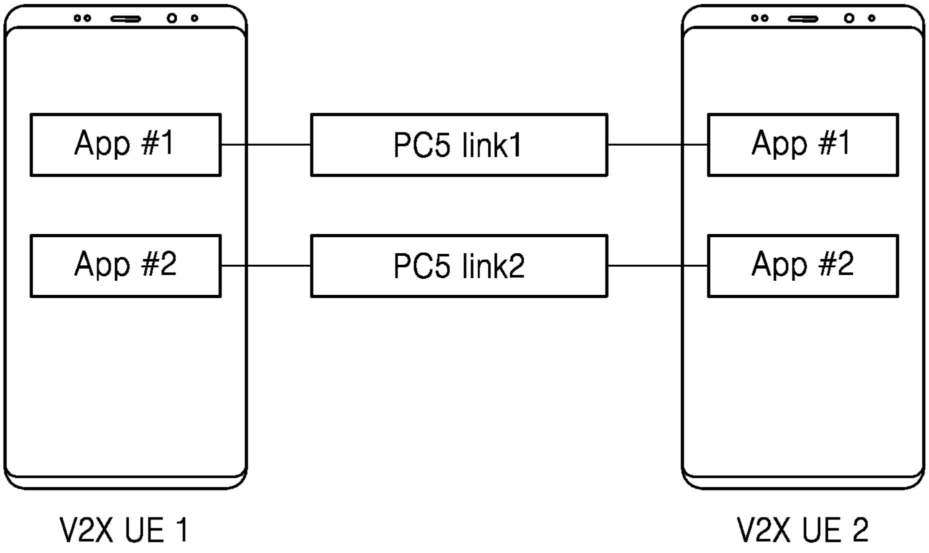
FIG. 1D illustrates a process for establishing the PC5 link for each application.

FIG. 1D illustrates a process for establishing the PC5 link for each application.

Thus, each application may have different DNNs and may require different UP security policies based on the application, as depicted in FIGS. 1*c* and 1*d*.

As per security requirements defined in 3GPP TS 33.501, the UP integrity protection is optional. That is, the UP security protection is enabled only for the necessary DRBs and may not use NIA0 (an example cipher algorithm). However, considering the security requirements defined for a ProSe (proximity services) direct mode of communication over the PC5 interface, the UP integrity protection is not required, but ciphering of the user plane data is mandatory.

Further, as per the security requirements defined in 3GPP TS 33.501, the UP confidentiality protection may be optional to use based on the UP security policy received by the gNB through a Session Management Function (SMF).

According to the 3GPP TR 23.795, the V2X communication has to be supported via the PC5 interface for the direct mode of communication and/or the Uu interface for the indirect mode of communication considering Key Performance Indicator (KPI) improvement.

Further, a V2X application enabler (VAE) server trigger switching of the communication modes (i.e., from the PC5 interface to the Uu interface or from the Uu interface to the PC5 interface).

The VAE server triggers the switching of the communication mode from the indirect mode of communication (the Uu interface) to the direct mode of communication (the PC5 interface), when a resource situation or network Quality of Service (QOS) are expected to downgrade for single or pre-defined group of UEs (based on the received monitoring events and/or network analytics).

The VAE server triggers switching of the communication mode from the direct mode of communication (the PC5 interface) to the indirect mode of communication (the Uu interface), when side-link conditions/QoS are expected to downgrade for single or pre-defined group of UEs (for example: based on the information from the UEs or from a V2X application specific server).

The UP security policy has to be activated while switching from the indirect mode of communication to the direct mode of communication or vice-versa (i.e., from the PC5 interface to the Uu interface or from the Uu interface to the PC5 interface). Activating the UP security policy while switching the communication modes may cause various security issues. If the security issues have not been addressed, an attacker may perform various attacking methods to trigger switching of the communication modes, which may lead to vulnerability to the user plane data.

Figure 1E:
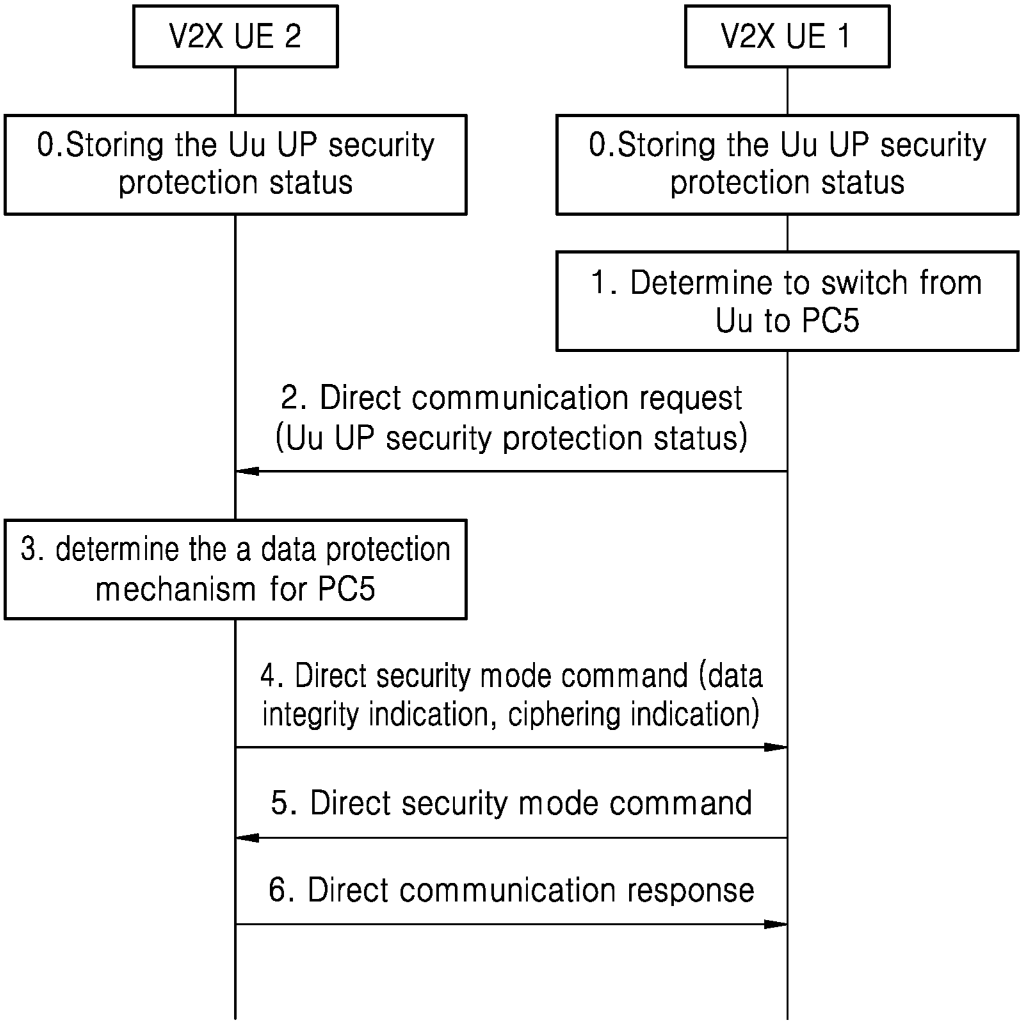
FIG. 1E is a sequence diagram illustrating a process of UP security activation while switching from an indirect mode to a direct mode.

FIG. 1E is a sequence diagram illustrating a process of UP security activation while switching from an indirect mode to a direct mode.

In case of switching from the indirect mode of communication to the direct mode of communication (i.e., from the Uu interface to the PC5 interface), as depicted in FIG. 1E, the UEs (the V2X UE1 and the V2X UE 2) that communicate over the Uu interface may store Uu UP security protection status between the UEs, which may be negotiated during the establishment of the PDU session. In such a method, the same security policy has to be used for the user plane data over the PC5 interface for the V2X communication. However, the UP security policy may be different for various applications.

Further, in the switching from the indirect mode of communication to the direct mode of communication (i.e., from the Uu interface to the PC5 interface), for all the applications, the DNN may be same and hence the security policy may be same. For example, for the V2X communication over the Uu, all the V2X applications may be bundled to a DNN (for example; a V2X DNN) irrespective of capabilities of the application, since all the applications may have the same security policy configured for the DNN in the SMF.

Figure 1F:
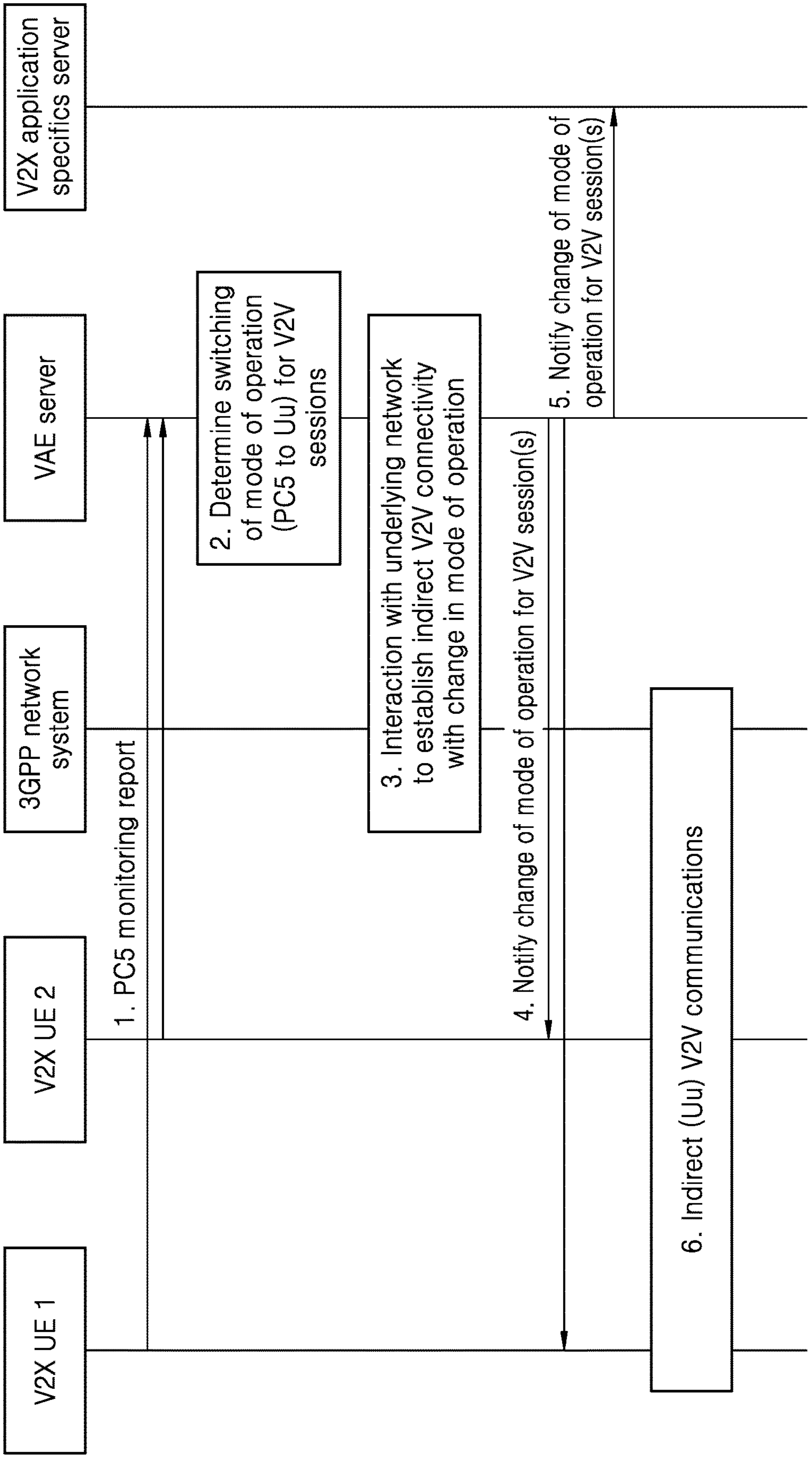
FIG. 1F is a sequence diagram illustrating a process of switching from a direct mode to an indirect mode.

FIG. 1F is a sequence diagram illustrating a process of switching from a direct mode to an indirect mode.

A V2X UE1 and a V2X UE 2 may transmit a PC5 monitoring report to a VAE server.

The VAE server may determine a switching of a mode of an operation for V2V sessions based on the PC5 monitoring report.

The VAE server and 3GPP network system may interact to establish indirect V2V connectivity with a change in the mode of operation.

The VAE server may transmit a notification associated with the change of mode of operation for the V2V sessions to the V2X UE1 and the V2X UE2.

The VAE server may transmit a notification associated with the change of mode of operation for the V2V sessions to a V2X application specific server.

The V2X UE1, the V2X UE2 and the 3GPP network system may perform indirect (Uu) V2V communications.

Figure 1G:
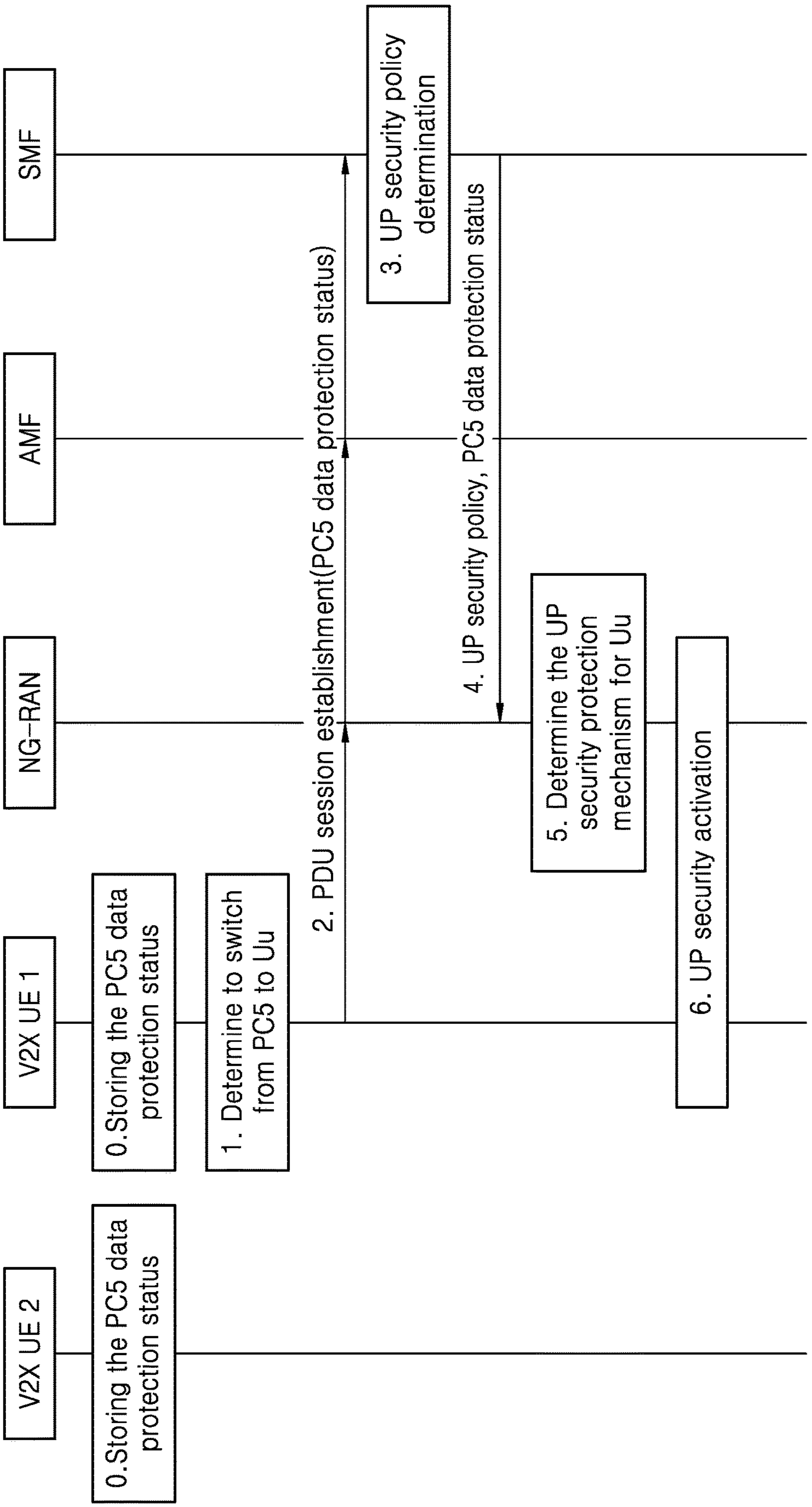
FIG. 1G is a sequence diagram illustrating a process of UP security activation while switching from a direct mode to an indirect mode.

FIG. 1G is a sequence diagram illustrating a process of UP security activation while switching from a direct mode to an indirect mode.

In case of switching from the direct mode of communication to the indirect mode of communication (i.e., from the PC5 interface to the Uu interface), as depicted in FIGS. 1*f* and 1*g*, the communicated UEs (for example; the UE1 and the UE 2) over the PC5 interface may have already stored PC5 data protection status, which may be negotiated during an establishment of the communication over the PC5 interface. The PC5 data protection status indicates a current status of the UP confidentiality protection (i.e., activated or not) and a current status of the UP integration protection (i.e., activated or not) for the PC5 interface.

The UE 1 determines to switch from the PC5 interface to the Uu interface based on the notification from the V2X application server or a measure report of the PC5 interface.

The SMF of a 5G core network determines and forwards the UP security protection policy and the PC5 data protection status to the NG-RAN/gNB.

The NG-RAN may activate or deactivate the UP confidentiality and/or the UP integrity protection for the PDU session, according to the received UP security policy and the PC5 data protection status. Otherwise, the NG-RAN may activate or deactivate the UP confidentiality and/or the UP integrity protection according to the clause 6.6.1 of 3GPP TS 33.501.

Further, in the switching from the direct mode of communication to the indirect mode of communication (i.e., from the PC5 interface to the Uu interface), if there are multiple applications associated with multiple services, there may be separate DNNs based on the applications. Therefore, for some DRBs, the UP security policy may set as "required" (i.e., the UP confidentiality protection is "required" and the UP integrity protection is required) and for the remaining DRBs, the UP security policy may set as "not required" (i.e., the UP confidentiality protection is "not required" and the UP integrity protection is "not required).

Thus, it may not be possible to use the same UP security policy for the user plane data over the PC5 interface. For example, in case of the communication over the PC5 interface, based on the application capabilities, to enhance energy conservation and to reduce the computation, Packet Data Convergence Protocol (PDCP) security may not be enabled, and the application layer security may be enabled.

Then, if 1:1 mapping of the Uu security policy is applied for the PC5 interface, then the PC5 interface may be inefficient. Further the communication scenario may become worst, if the application does not require the Uu security, but over the PC5 interface, the application requires the PDCP protection. If the 1:1 mapping of the Uu security policy is applied for the PC5 interface, then the PC5 interface becomes vulnerable to attacks.

Thus, there may be no explicit security policy indication from the network to the UE for the protection of the user plane data over the PC5 interface. The principal object of the embodiments herein is to disclose methods and systems for handling security policies in a Vehicle-to-Everything (V2X) communication system.

Another object of the embodiments herein is to disclose methods and systems for provisioning User Plane (UP) security policy for protecting user plane data over a PC5 unicast link, wherein the UP security policy indicates a requirement of activation or deactivation of at least one of, UP integrity protection and UP confidentiality protection on the user plane data to be communicated over the PC5 unicast link.

Another object of the embodiments herein is to disclose methods and systems for using one of, a "required" field, a "preferred" field and a "not needed" field to indicate the requirement of activation or deactivation of at least one of, the UP integrity protection and the UP confidentiality protection.

Another object of the embodiments herein is to disclose the methods and systems for provisioning a condition for rejection of PC5 link communication.

Accordingly, the embodiments herein provide methods and systems for handling security policies in a Vehicle-to-Everything (V2X) communication system. A method disclosed herein includes receiving a registration request message from a first User Equipment (UE), when the first UE wants to initiate a unicast communication with a second UE over a PC5 unicast link. The method further includes provisioning at least one User Plane (UP) security policy for the PC5 unicast link. The method further includes sending the provisioned at least one UP security policy to the first UE for initiating the unicast communication with the second UE over the PC5 unicast link.

Accordingly, the embodiments herein provide a Vehicle-to-Everything (V2X) communication system comprising a plurality of User Equipments and at least one Radio Access Technology (RAT), wherein each RAT includes a Radio Access Network (RAN) node and a Core Network (CN). The CN is configured to receive a registration request message from a first UE of the plurality of UEs, when the first UE wants to initiate a unicast communication with a second UE of the plurality of UEs over a PC5 unicast link. The CN is further configured to provision at least one User Plane (UP) security policy for the PC5 unicast link. The CN is further configured to send the provisioned at least one UP security policy to the first UE for initiating the unicast communication with the second UE over the PC5 unicast link.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for handling security policies in a Vehicle-to-Everything (V2X) communication system. Referring now to the drawings, and more particularly to FIGS. 2 through 11, where similar reference characters denote corresponding features consistently throughout the figures, there are shown example embodiments.

Figure 2:
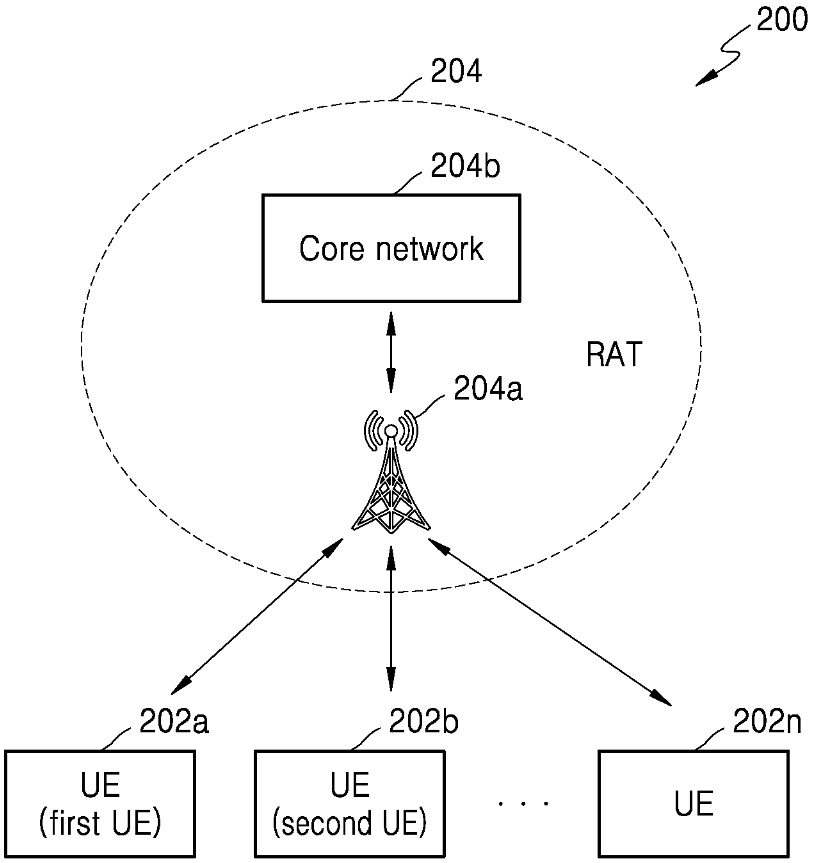
FIG. 2 depicts a V2X communication system, according to embodiments as disclosed herein.

FIG. 2 depicts a Vehicle-to-Everything (V2X) communication system 200, according to embodiments as disclosed herein. The V2X communication 200 referred herein may be a system for performing V2X communication. The V2X communication may include at least one of, but is not limited to, vehicle to vehicle to communication (V2V), vehicle to infrastructure (V2I) communication, vehicle to network (V2N) communication, and so on. The V2V communication refers to communication between vehicles. The V2I communication refers to communication between the vehicles and a traffic signal apparatus. The V2N communication refers to communication between the vehicles and a user terminal.

The V2X communication may support two modes of operations, the V2X communication over a PC5 unicast link and the V2X communication over a Uu interface. The V2X communication over the PC5 unicast link may be a direct mode of communication and the V2X communication over the Uu interface may be an indirect mode of communication.

The PC5 unicast link may correspond to a device-to-device (D2D) interface, which may be used for proximity services (ProSe). Also, the PC5 unicast link may correspond to a side link defined at a physical layer, which may be used for the direct mode of communication between the proximity vehicles. Performing the V2X communication over the PC5 unicast link enhances speed and density of the communication.

Embodiments herein use the terms "PC5 unicast link", "PC5", "PC5 link", "PC5 reference point", "PC5 interface", and so on interchangeably, to refer to a D2D interface used for the direct mode of communication between the vehicles.

The Uu interface/air interface may refer to a radio access that may be established between the vehicles through a Base Station (which supports at least one of New Radio (NR)/5G network, Long Term Evolution (LTE) network, or the like).

In an example herein, the Uu interface may be at least one of, a NR-Uu interface, an LTE Uu interface, or the like. Embodiments herein use the terms "Uu interface", "air interface", "NR Uu interface", "LTE interface", and so on, interchangeably to refer to an interface used for establishing the indirect mode of communication between the vehicles.

The V2X communication system 200 may include User Equipments (UEs) 202*a*-202*n*, and a Radio Access Technology (RAT)/wireless network 204.

The UEs 202*a*-202*n* referred herein may be a device mounted on the vehicle or being used by a user/operator of the vehicle to perform the V2X communication. The UE 202*a*-202*n* referred herein may be a fixed/stationary device or a mobile device. Examples of the UEs 202*a*-202*n* may be, but are not limited to, a mobile phone, a smart phone, a tablet, a handheld device, a phablet, a laptop, a wearable computing device, an Internet of Thing (IoT) device, a multimedia device, a vehicle-mounted device, or any other device capable of performing the V2X communication. Embodiments herein use the terms such as "UE", "Mobile Terminal (MT)", "Mobile Station", "User Terminal (UT)", "Mobile Subscriber Station (MSS)", "Subscriber Station (SS)", "Wireless Terminal (WT)", "D2D device", "vehicle", "vehicle-mounted device", and so on, interchangeably to refer to a device that may be capable of performing the V2X communication.

The UE 202*a*-202*n* may include components such as, but are not limited to, a transceiver (may be referred to as a receiver, a transmitter and/or a transceiver herein), a signal processing circuitry, a processor, a communication interface, a memory, and so on (not shown) to perform at least one intended function. The UE 202*a*-202*n* may include one or more applications/V2X applications in the memory that may be configured to provide one or more services/V2X services. The one or more applications may support a Data Network Name (DNN). The DNN here is used as an example, it refers that one or more services supported by an application may have same Data network name.

In an embodiment, the terms "service", "application", "V2X application", "V2X service", and so on, interchangeably through the document, as per the definition of the V2X service defined in the 3GPP TS 23.287. The V2X service may be a service, offered by the V2X applications and an optionally a V2X application server. The V2X application may include a message or other data delivery, as defined in the 3GPP TS 22.185 and the 3GPP TS 22.186. The V2X service may be associated with the one or more V2X applications and the V2X application may be associated with the one or more V2X services.

In an embodiment, the UEs 202*a*-202*n* may be configured for performing the unicast V2X communication with each other over the PC5 unicast link and the Uu interface. Embodiments herein use the terms "unicast communication", "one-to-one communication", "V2X communication", "unicast V2X communication, "one-to-one communication, and so on interchangeably. The UEs 202*a*-202*n* may perform the V2X communication to exchange data traffic/user plane data/traffic between each other. The data traffic/user plane data may refer to data corresponding to the one or more applications/one or more services supported by the UE(s) 202*a*-202*n*. In an example, the data may include at least one of, but is not limited to, video, audio, files, and so on. Embodiments herein use the terms "user plane data", "user plane traffic", "data traffic", "application data", "service data", and so on, interchangeably to refer to data corresponding to the one or more applications/services supported by the UE.

The RAT 204 referred herein may be at least one of, but is not limited to, a Third Generation Partnership Project (3GPP) 3rd Generation (3G), a Long Term Evolution (LTE/4G), an LTE-Advanced (LTE-A), a Fifth Generation (5G) New Radio (NR), a Wireless Local Area Network (WLAN), a Worldwide Interoperability for Microwave Access (WiMAX/IEEE 802.16), a Wi-Fi (IEEE 802.11), an Evolved-UTRA (E-UTRA), or any other next generation network supporting the V2X communication. The RAT 204 may include one or more Base Stations (BSs) 204*a*, and a core network (CN) 204*b*.

The BS 204*a* may be a Radio Access Node (RAN) including at least one of, an evolved node (eNB) of the LTE, a gNodeB (gNB)/5G logical node, and so on. The BS 204*a* may be configured to communicate with the UEs 202*a*-202*n* and to connect the UEs 202*a*-202*n* with the CN 204*b*. Embodiments herein use the terms such as 'BSs", "cells", "macro-BSs", "pico-BSs", "eNodeBs (eNBs)", "gNBs", and so on, interchangeably to refer to a Base Transceiver System (BTS)/station that communicates with the UEs 202*a*-202*n*.

The CN 204*b* may include at least one of, an Evolved Packet Core (EPC) of the LTE, a 5G core (5GC) network, and so on. The CN 204*b* may communicate with the UEs 202*a*-202*n* through the associated BS 204*a* and connect the UEs 202*a*-202*n* to an external data network. Examples of the external data network may be, but are not limited to, the Internet, a Packet Data Network (PDN), an Internet Protocol (IP) Multimedia Core Network Subsystem, and so on.

The BS 204*a* and the CN 204*b* may comprise one or more processors/Central Processing Units (CPUs), a memory, a storage, a transceiver, and so on, for performing at least one intended function/operation.

In an embodiment, the CN 204*b* may be configured to handle security policies for the UEs 202*a*-202*n*, when the UEs 202*a*-202*n* initiate the V2X communication with each other over the PC5 unicast link. Handling security policies involves provisioning/defining the security policy for the PC5 unicast link to protect the data traffic/user plane data exchanged between the UEs 202*a*-202*n* over the PC5 unicast link.

The CN 204*b* may receive a registration request message from a UE (for example; a UE 202*a*) of the plurality of UEs (202*a*-202*n*) (hereinafter referred as a first UE, or a transmitting UE, or an originating UE, or the like) through the associated BS 204*a*, when the first UE 202*a* initiates the V2X communication with the other UE (for example: a UE 202*b*) (hereinafter referred as a second UE or a terminating UE, or a receiving UE, or the like) over the PC5 unicast link. The first UE 202*a* may initiate the V2X communication with the second UE 202*b* to communicate or exchange the data traffic with the second UE 202*b*. The registration request message may include information such as, but are not limited to, PC5 capabilities of the first UE 202*a*, the one or more applications supported by the first UE 202*a*, the one or more services supported by the first UE 202*a*, and so on. The PC5 capabilities may include ciphering and integrity method to be implemented or supported by the UE(s) 202*a*-202*n*.

On receiving the registration request message from the first UE 202*a*, the CN 204*b* may provision the security policy for the PC5 unicast link. In an embodiment, the security policy may be a User Plane (UP) security policy, which may be provisioned for protecting the data traffic to be communicated between the first UE 202*a* and the second UE 202*b* over the PC5 unicast link. In an embodiment, provisioning the UP security policy for the PC5 unicast link refers to provisioning the UP security policy for the data traffic to be communicated over the PC5 unicast link. The UP security policy may include UP confidentiality protection and UP integrity protection. The UP confidentiality protection and the UP integrity protection may be inferred by any ordinary person skilled in the art based on definitions provided in the 3GPP specification TS 33.501 v17.0.0, thus, detailed description of each is omitted herein.

For provisioning the UP security policy, the CN 204*b* may decode the received registration request message and identify at least one of, but is not limited to, the PC5 capabilities of the first UE 202*a*, the one or more applications supported by the first UE 202*a*, the one or more services supported by the first UE 202*a*, and so on. The CN 204*b* may provision the UP security policy based on the PC5 capabilities of the first UE 202*a* (i.e., based on the UE's capability of supporting the V2X communication and the ciphering and integrity method), the one or more applications supported by the first UE 202*a*, the one or more services supported by the first UE 202*a*, and so on.

In an embodiment, provisioning the UP security policy for the PC5 unicast link may include provisioning the UP security policy for each application or each service supported by the first UE 202*a* and/or the second UE 202*b* over the PC5 unicast link. As each application is associated with the one or more services, provisioning of the UP security policy for each application implies provisioning of the UP security policy per service in the application.

Each of the one or more services supported by each application of the first UE 202*a* uses the same PC5 unicast link. Further, the one or more services in the first UE 202*a* and/or the second UE 202*b* using the same PC5 unicast link may use a same Application Layer ID within the application. The application layer ID may be an identifier identifying an entity such as but are not limited to, a vehicle, a pedestrian, a vehicular and roadside unit (RSU) within the context of a specific V2X application, and so on. The clause 5.2.1.4 in the 3GPP TS 23.287 indicates that the PC5 unicast link between the two UEs (202*a*-202*n*) allows the V2X communication between one or more pairs of peer V2X services in the UEs (202*a*-202*n*). All the services in the UE using the same PC5 unicast link may use the same application layer ID. All the services in the application (if uses the same PC5 link) may have the same PC5 security policy provisioned. In an embodiment "per service' maps to "per application/each application" through the document.

In another embodiment, provisioning the UP security policy for the PC5 unicast link may include provisioning the UP security policy for initiating the V2X communication or ProSe communication between the first UE 202*a* and the second UE 202*b*.

The UP security policy provisioned for the PC5 unicast link indicates a requirement of activation or deactivation of at least one of, the UP integrity protection and the UP confidentiality protection on the data traffic to be communicated between the first UE 202*a* and the second UE 202*b* over the PC5 unicast link. In an embodiment, the CN 204*b* may indicate the requirement of activation or deactivation of at least one of, the UP integrity protection and the UP confidentiality protection on the data traffic using one of fields such as, a "required" field, a "preferred" field, and a "not needed" field.

The "required" field indicates that at least one of the UP integrity protection and the UP confidentially protection has to be activated for the data traffic, which has to be communicated between the first UE 202*a* and the second UE 202*b* over the PC5 unicast link. The "preferred field" indicates that the at least one of the UP integrity protection and the UP confidentially protection has to be activated for the data traffic, which has to be communicated between the first UE 202*a* and the second UE 202*b* over the PC5 unicast link, only if the second UE 202*b* wants to activate at least one of the UP integrity protection and the UP confidentiality protection for the data traffic. The "not needed" field indicates that the activation of the at least one of the UP integrity protection and the UP confidentially protection is not required on the data traffic, which has to be communicated between the first UE 202*a* and the second UE 202*b* over the PC5 unicast link.

The CN 204*b* may communicate the provisioned UP security policy to the first UE 202*a* through the associated BS 204*a*, for initiating the unicast (one-to-one) V2X communication with the second UE 202*b* over the PC5 unicast link.

On receiving the UP security policy from the CN 204*b*, the first UE 202*a* may store the UP security policy. The first UE 202*a* may also transmit the received UP security policy that has been provisioned for the PC5 unicast link to the second UE 202*b* for establishing the direct communication with the second UE 202*b* corresponding to the one or more applications. The second UE 202*a* may store the UP security policy received from the first UE 202*a* corresponding to the one or more applications. Transmitting of the UP security policy by the first UE 202*a* to the second UE 202*b* is described in detail in conjunction with FIG. 11.

The first UE 202*a* may initiate the V2X communication with the second UE 202*b* to communicate the data traffic corresponding to the one or more applications/services over the PC5 unicast link. On initiating the V2X communication with the second UE 202*b*, the first UE 202*a* may communicate the provisioned UP security policy to the second UE 202*b* in a direct communication request message.

On receiving the direct communication request message including the UP security policy, the second UE 202*b* may check if there is any discrepancy in the UP security policy received from the first UE 202*a*. For checking the discrepancy in the UP security policy, the second UE 202*b* may compare the UP security policy received from the first UE 202*a* with the stored UP security policy for the PC5 unicast link. If the UP security policy received from the first UE 202*a* does not match with the stored UP security policy, the second UE 202*b* may detect the discrepancy in the UP security policy received from the first UE 202*a*.

On detecting the discrepancy in the UP security policy received from the first UE 202*a*, the second UE 202*b* may terminate the V2X communication with the first UE 202*a* by rejecting the direct communication request message. In an example, the second UE 202*b* may reject the direct communication request message received from the first UE 202*a*, if the received UP security policy has either the confidentiality/integrity protection set to “not needed” and its own corresponding policy (i.e., the stored UP security policy) is set to “required”. In another example, the second UE 202*b* may reject the direct communication request message received from the first UE 202*a*, if the received UP security policy had either confidentiality/integrity set to “required” and its own corresponding policy is set to “not needed”.

If the UP security policy received from the first UE 202*a* matches with the stored UP security policy for the PC5 unicast link, the second UE 202*b* may accept the direct communication request message of the first UE 202*a*. On accepting the direct communication request message by the second UE 202*b*, the first UE 202*a* may apply the provisioned UP security policy on the PC5 unicast link (i.e., applying the UP security policy on the data traffic) and communicate the data traffic to the second UE 202*b* over the PC5 unicast link, thereby protecting the data traffic/user plane traffic. In an embodiment, the second UE 202*b* may transmit, to the first UE 202*a*, a response message indicating whether the direct communication request message is accepted or rejected by the second UE as a response to the direct communication request message. For example, in case that the direct communication request message is accepted by the second UE 202*b*, the second UE 202*b* may transmit, to the first UE 202*a*, the response message including a configuration of user plane confidentiality protection of user plane integrity protection based on agreed user place security policy. In case that the direct communication request message is rejected by the second UE 202*b*, the second UE 202*b* may transmit, to the first UE 202*a*, the response message indicating that the direct communication request message is not accepted by the second UE 202*b*. In another embodiment, the second UE 202*b* may not transmit, to the first UE 202*a*, any message in response to the direct communication request message. The first UE 202*a* may start a timer when transmitting the direct communication request to the second UE 202*b* and if the first UE 202*a* does not received any message in response to the direct communication request message for a predetermined time period, the first UE 202*a* may determine that the direct communication request message is rejected by the second UE 202*b*.

In an embodiment, the CN 204*b* may also be configured to create a one-to-one mapping (1:1 mapping), while switching from the direct mode of communication between the UEs 202*a*-202*n* to the indirect mode of communication between the UEs 202*a*-202*n*. The switching from the direct mode of communication to the indirect mode of communication refers to switching the communication between the UEs 202*a*-202*n* over the PC5 unicast link to the communication between the UEs 202*a*-202*n* over the Uu interface. The 1:1 mapping may be created between the UP security policy of the PC5 unicast link and the UP security policy of the Uu interface.

In an embodiment, the CN 204*b* may create the 1:1 mapping by re-configuring a Packet Data Convergence Protocol (PDCP) instance created for the Uu interface to a PDCD instance of the PC5 unicast link. The CN 204*b* may re-configure the PDCP instance created for the Uu interface to the PDCP instance of the PC5 unicast link by changing one or more parameters of the PC5 unicast link and retaining the UP security policy configured in the PDCP instance of the PC5 unicast link. Examples of the parameters may be, but are not limited to, a logic channel identifier (LCID), security keys, and PDCP counts. Creation of the PDCP instance of the Uu interface and the PC5 unicast link may be inferred by an ordinary person skilled in the art by referring to the 3GPP specification TS 38.323 v16.2.0, thus its detailed description is omitted herein.

FIG. 2 depicts exemplary units/components of the V2X communication system 200, but it is to be understood that other embodiments are not limited thereon. In other embodiments, the V2X communication system 200 may include less or a greater number of units. Further, the labels or names of the units are used only for illustrative purpose and does not limit the scope of the embodiments herein. One or more units can be combined together to perform same or substantially similar function in the V2X communication system 200.

Figure 3:
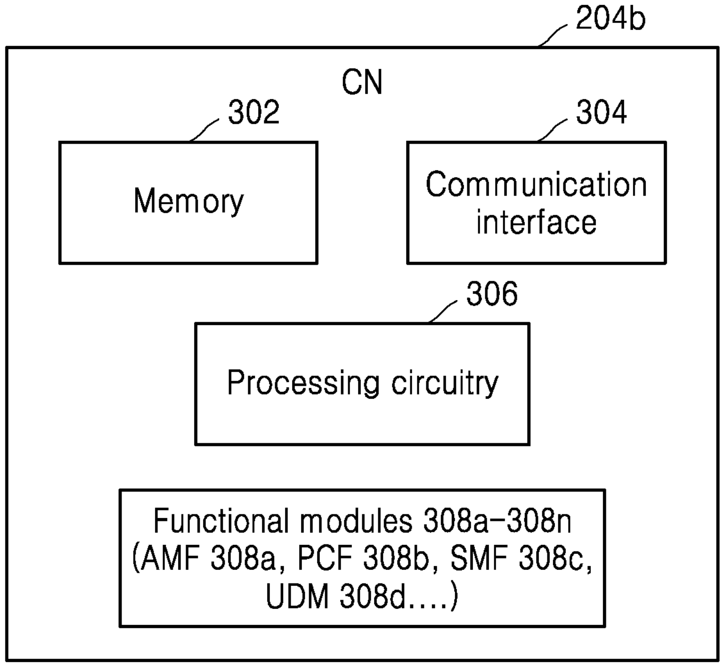
FIG. 3 is an example block diagram depicting components of a Core Network (CN) for provisioning a UP security policy for a PC5 unicast link, according to embodiments as disclosed herein.

FIG. 3 is an example block diagram depicting components of the CN 204*b* for provisioning the UP security policy for the PC5 unicast link, according to embodiments as disclosed herein. The CN 204*b* may include a memory 302, a communication interface 304, a processing circuitry 306, and functional modules 308*a*-308*n*.

The memory 302 may store at least one of, information about the UEs 202*a*-202*n*, the UP security policy provisioned for the PC5 unicast corresponding to each UE, and so on. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In certain examples, a non-transitory storage medium may store data that can, over time, change (e.g., in Random Access Memory (RAM) or cache).

The communication interface 304 may be configured to enable the CN 204*b* to communicate with the UEs 202*a*-202*n* through the associated BS(s) 204*a* over an interface. Examples of the interface may be, but are not limited to, a wired interface, a wireless interface (for example: an air interface, a Nu interface, an LTE interface, an NR interface, or the like), a wireless fronthaul interface, a wired or wireless backhaul interface, or any structure supporting communications over a wired or wireless connection.

The processing circuitry 306 may be at least one of a single processer, a plurality of processors, multiple homogeneous or heterogeneous cores, multiple Central Processing Units (CPUs) of different kinds, microcontrollers, special media, and other accelerators. The processing circuitry 306 may be configured to enable functional modules 308*a*-308*n* to perform at least one intended function.

The functional modules 308*a*-308*n* may vary based on a type of the CN 204*b* or the RAT 204 supported by the CN 204*b*. In an example, if the CN 204*b* is a 5G core (5GC) supporting the NR/5G RAT, the CN/5GC 204*b* may include the functional modules 308 such as, but are not limited to, a 5G Core Access and Mobility Management Function (AMF) 308*a*, a Policy Control Function (PCF) 308*b*, a 5G Session Management Function (SMF) 308*c*, a Unified Data Management (UDM) 308*d*, and so on.

A first functional module/AMF 308*a* may be configured to receive the registration request from the UE (for example: the UE/first UE 202*a* of the plurality of UEs 202*a*-202*n*) through the associated BS/NG RAN 204*a*. The first functional module/AMF 308*a* may receive the registration request message, when the UE 202*a* wants to initiate the V2X communication with other UE(s) (for example: a second UE 202*b* of the plurality of UEs 202*a*-202*n*). The registration request message may include information such as, but are not limited to, the PC5 capabilities of the UE 202*a*, the one or more applications supported by the first UE 202*a*, the one or more services supported by the UE 202*a*, and so on. On receiving the registration request message from the UE 202*a*, the first functional module/AMF 308*a* checks if the UE 202*a* is authorized to initiate the V2X communication over the PC5 unicast link (according to the 3GPP specification). If the UE 202*a* is authorized to initiate the V2X communication over the PC5 unicast link, the first functional module/AMF 308*a* may select the second functional module/PCF 308*b*, that may support V2X information provisioning.

The selected second functional module/PCF 308*b* may be configured to provision the UP security policy for the PC5 unicast link. Also, the second functional module/PCF 308*b* may provision the UP security policy for the PC5 unicast link and other/V2X communication parameters. In an embodiment, the second functional module/PCF 308*b* may provision the UP security policy for the PC5 unicast link, during service authorization and information provisioning defined in the 3GPP TS 23.287. The second functional module/PCF 308*b* may provision the UP security policy for the PC5 unicast link based on the PC5 capabilities of the UE 202*a*, the one or more applications supported by the UE 202*a*, the one or more services supported by the UE 202*a*, and so on. In an embodiment, the second functional module/PCF 308*b* may provision the UP security policy for each application or each service supported by the UE 202*a* over the PC5 unicast link. In another embodiment, the second functional module/PCF 308*b* may provision the UP security policy for each PC5 unicast link for initiating the V2X communication or the ProSe communication between the first UE 202*a* and the second UE 202*b*.

The UP security policy provisioned for the PC5 unicast indicates: whether the UP integrity protection is "Required"—for all the data traffic over the PC5 unicast link, the UP integrity protection has to be activated;

"Preferred"—for all the data traffic over the PC5 unicast link, the UP integrity protection has to be activated only if the second UE 202*b* wants to activate the UP integrity protection; and "Not needed"—for all the data traffic over the PC5 unicast link, the UP integrity protection has not to be activated; and whether the UP confidentiality protection is:

"Required"—for all the data traffic over the PC5 unicast link, the UP confidentiality protection has to be activated;

"Preferred"—for all the data traffic over the PC5 unicast link, the UP confidentiality protection has to be activated only if the second UE 202*b* wants to activate the UP confidentiality protection; and "Not needed"—for all the data traffic over the PC5 unicast link, the UP confidentiality protection has not to be activated.

On provisioning the UP security policy, the second functional module/PCF 308*b* may communicate the provisioned UP security policy for the PC5 unicast link to the UE 202*a* through the associated BS/NG RAN 204*a*.

In an embodiment, the UP security policy indicates the BS/NG RAN 204*a* about the UP security policies for a Protocol Data Unit (PDU) session for security protection of the user plane data communication over the Uu interface. When the UE (202*a*-202*n*) establishes the PDU session, the UE may also be aware of the UP security policy for the PC5 unicast link.

In an embodiment, the UE 202*a* may also obtain the UP security policy for the PC5 unicast link from a third functional module/SMF 308*c* of the CN 204*b*. The third functional module/SMF 308*c* provides the UP security policy for both the Uu (at the DNN granularity) and the PC5 unicast link (at application/PC5 link granularity). In an embodiment, the third functional module/SMF 308*c* may provision the UP security policy for the PC5 unicast link. In another embodiment, the third functional module/SMF 308*c* may store the UP security policy provisioned by the second functional module/PCF 308*b*.

In an embodiment, the UE 202*a* may also retrieve the UP security policy for the applications over the PC5 unicast link from a fourth functional module/the UDM 308*d* in subscription data or locally configured per application based, in the third functional module/SMF 308*c*. The UP security policy for the applications (supporting the DNN) over the PC5 unicast link may also be communicated from the third functional module/SMF 308*c* to the BS/NG-RAN 204*a* as part of the PDU session related information along with the UP security policy for the Uu interface. In an embodiment, the BS/NG-RAN 204*a* shares the UP security policy for both the Uu interface and the UP security policy for the PC5 with the UE 202*a* in a Radio Resource Control (RRC) connection reconfiguration message.

In an embodiment, the second functional module/PCF 308*b* may also be configured to create the 1:1 mapping while switching the communication between the UEs 202*a*-202*n* over the PC5 unicast link to the Uu interface. Creating the 1:1 mapping involves re-configuring the PDCP instance created for the Uu interface to the PDCD instance of the PC5 unicast link by changing the one or more parameters of the PC5 unicast link and retaining the UP security policy configured in the PDCP instance of the PC5 unicast link.

In an embodiment, the CN 204*b* may also maintain a mapping of the UP security policy between the DNN and the PC5 unicast link and configure the mapping in the UE (202*a*-202*n*).

FIG. 3 depicts exemplary units/components of the CN 204*b*, but it is to be understood that other embodiments are not limited thereon. In other embodiments, the CN 204*b* may include less or a greater number of units. Further, the labels or names of the units are used only for illustrative purpose and does not limit the scope of the embodiments herein. One or more units can be combined together to perform same or substantially similar function in the CN 204*b*.

Figure 4:
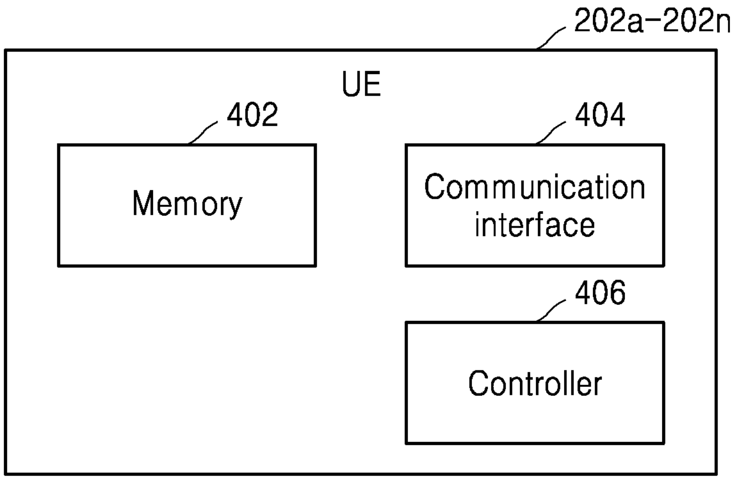
FIG. 4 is an example block diagram depicting components of a User Equipment (UE) of a plurality of UEs, according to embodiments as disclosed herein.

FIG. 4 is an example block diagram depicting components of the UE of the plurality of UEs 202*a*-202*n*, according to embodiments as disclosed herein. The UE (202*a*-202*n*) includes a memory 402, a communication interface 404, and a controller 406.

The memory 402 may store at least one of, the one or more applications, the UP security policy for the PC5 unicast link, and so on. Examples of the memory 402 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on.

The communication interface 404 may be configured to enable the UE 202*a*-202*n* to communicate with the CN 204*b* through the associated BS(s) 204*a* over the interface. Examples of the interface may be, but are not limited to, a wired interface, a wireless interface (for example: an air interface, a Nu interface, an LTE interface, an NR interface, or the like), a wireless fronthaul interface, a wired or wireless backhaul interface, or any structure supporting communications over a wired or wireless connection. The communication interface 404 may also be configured to enable the UE 202*a* to communicate with the other UEs 202*b*-202*n* over the PC5 unicast link and the Uu interface.

The controller 406 may be at least one of a single processor, a plurality of processors, multiple homogeneous or heterogeneous cores, multiple Central Processing Units (CPUs) of different kinds, microcontrollers, special media, and other accelerators.

The controller 406 may be configured to enable the UE 202*a* to send the registration request message to the CN 204*b* and to receive the UP security policy for the PC5 unicast link from the CN 204*b* in response to the registration request message, when the UE 202*a* wants to initiate the V2X communication with the other UE 202*b*-202*n*. The controller 406 stores the received UP security policy from CN 204*b* in the memory 402. The UE 202*a* forwards the UP security policy to the other UE 202*b*-202*n* in the direct communication message for initiating the V2X communication over the PC5 unicast link.

The controller 406 may also be configured to enable the UE 202*a* to receive the direct communication message from the other UE 202*b*-202*n*, when the other UE 202*b*-202*n* wants to initiate the V2X communication with the UE 202*a* over the PC5 unicast link. The direct communication message may include the UP security policy of the other UE 202*b*-202*n*.

The controller 406 may compare the received UP security policy of the other UE 202*b*-202*n* with the stored UP security policy. The controller 406 determines the discrepancy/mismatch in the received UP security policy of the other UE 202*b*-202*n*, if the received UP security policy of the other UE (202*b*-202*n*) does not match with the stored UP security policy and rejects the direct communication message of the other UE 202*b*-202*n* for the V2X communication over the PC5 unicast link. The controller 406 determines that there is no discrepancy in the received UP security policy of the other UE 202*b*-202*n*, if the received UP security policy of the other UE 202*b*-202*n* matches with the stored UP security policy and accepts the direct communication message of the other UE 202*b*-202*n* for the V2X communication over the PC5 unicast link.

FIG. 4 depicts exemplary units/components of the UE 202*a*-202*n*, but it is to be understood that other embodiments are not limited thereon. In other embodiments, the UE 202*a*-202*n* may include less or a greater number of units. Further, the labels or names of the units are used only for illustrative purpose and does not limit the scope of the embodiments herein. One or more units can be combined together to perform same or substantially similar function in the UE (202*a*-202*n*).

Figure 5:
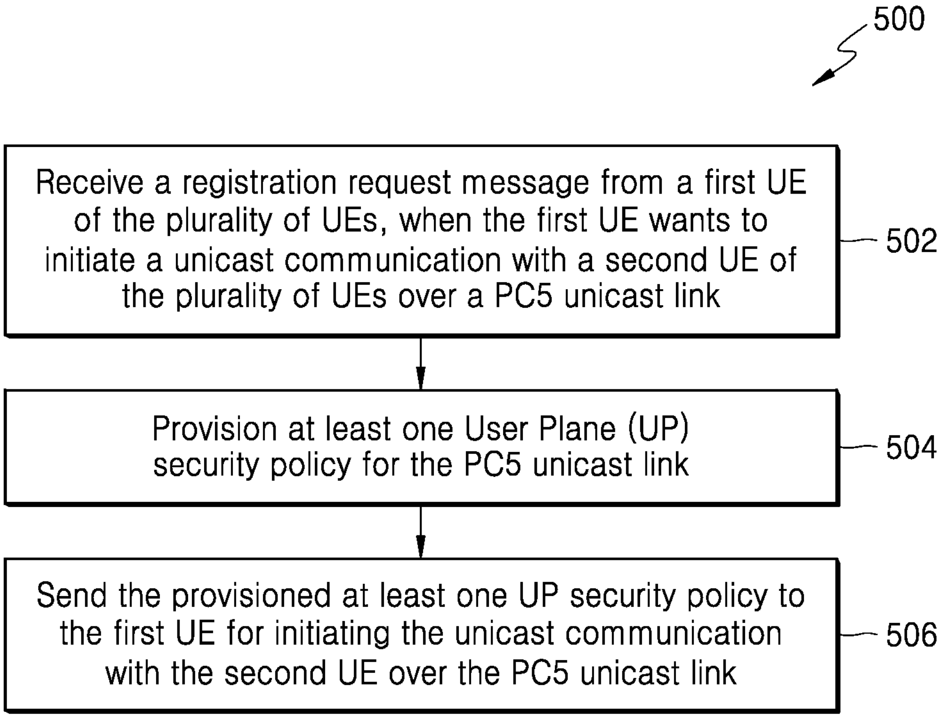
FIG. 5 is a flow diagram depicting a method for handling security policies in the V2X communication system, according to embodiments as disclosed herein.

FIG. 5 is a flow diagram 500 depicting a method for handling the security policies in the V2X communication system, according to embodiments as disclosed herein.

At step 502, the method includes receiving, by the CN 204*b*, the registration request message from the first UE 202*a*, when the first UE 202*a* wants to initiate the V2X unicast communication with the second UE 202*b* over the PC5 unicast link.

At step 504, the method includes provisioning, by the CN 204*b*, the UP security policy for the PC5 unicast link. The UP security policy indicates the requirement of activation or deactivation of at least one of, the UP integrity protection and the UP confidentiality protection on the user plane data to be communicated over the PC5 unicast link. The requirement of activation or deactivation of at least one of, the UP integrity protection and the UP confidentiality protection on the user plane data/data traffic is indicated using one of, the "required" field, the "preferred" field", and the "not needed" field.

At step 506, the method includes sending, by the CN 204*b*, the provisioned UP security policy to the first UE 202*a* for initiating the V2X unicast communication with the second UE 202*b* over the PC5 unicast link. The various actions in method 500 may be performed in the order presented, in a different order or simultaneously. Further, in some embodiments, some actions listed in FIG. 5 may be omitted.

Embodiments herein further explain provisioning of the UP security policy by the CN 204*b* that supports the NR/5G RAT 204, as an example, but it may be obvious to a person skilled in the art any CN supporting any other RAT may be considered. The CN 204*b* supporting the NR/5G RAT 204 may be the 5GC 204*b*, which connects with the NG RAN (an example BS) 204*a*. The 5GC 204*b* includes the AMF 308*a*, the PCF 308*b*, the SMF 308*c*, the UDM 308*d*, and so on.

Figure 6:
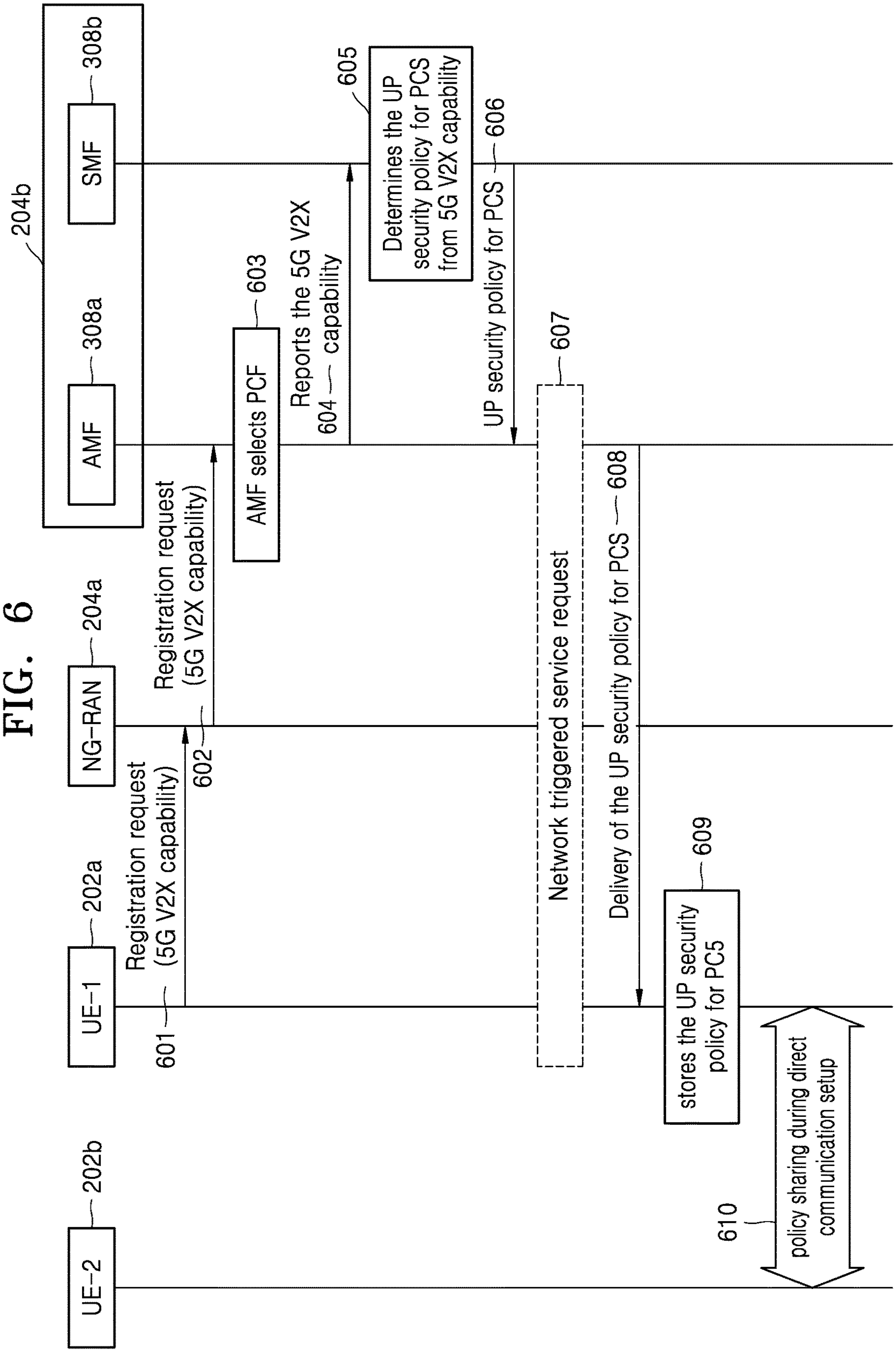
FIG. 6 is an example sequence diagram depicting a method for provisioning the UP security policy for the PC5 unicast link, according to embodiments as disclosed herein.

FIG. 6 is an example sequence diagram depicting a method for provisioning the UP security policy for the PC5 unicast link, according to embodiments as disclosed herein.

At step 601, the first UE 202*a* (UE-1) sends the registration request message to the NG-RAN 204*a*, when the first UE 202*a* wants to initiate the V2X unicast communication with the second UE (UE-2) over the PC5 unicast link. The registration request message includes the PC5/5G V2X capabilities of the first UE 202*a*.

At step 602, the NG-RAN 204*a* forwards the registration request message of the first UE 202*a* to the AMF 308*a* of the 5GC 204*b*. On receiving the registration request message of the first UE 202*a*, at step 603, the AMF 308*a* selects the PCF 308*b* that supports the V2X provisioning information, if the first UE 202*a* is authorized for performing the V2X communication over the PC5 unicast link. At step 604, the AMF 308*a* communicates the PC5 capabilities of the first UE 202*a* to the selected PCF 308*b*.

At step 605, the PCF 308*b* provisions the UP security policy for the PC5 unicast link based on the PC5 capabilities of the first UE 202*a*. The UP security policy indicates the requirement of activation or deactivation of the UP confidentiality protection and the UP integrity protection on the data traffic over the PC5 unicast link using one of, the "required" filed, the "preferred" field, and the "not needed" field.

At step 606, the PCF 308*b* communicates the UP security policy provisioned for the PC5 unicast link to the AMF 308*a*.

At step 607, the AMF 308*a* triggers a service request for establishing the PDU session with the first UE 202*a* through the NG RAN 204*a*.

At step 608, the AMF 308*a* forwards the received UP security policy to the first UE 202*a*.

At step 609, the first UE 202*a* stores the received UP security policy for the PC5 unicast link.

At step 610, the first UE 202*a* shares the UP security policy for the PC5 unicast link to the second UE 206 in the direct communication message/setup.

Figure 7:
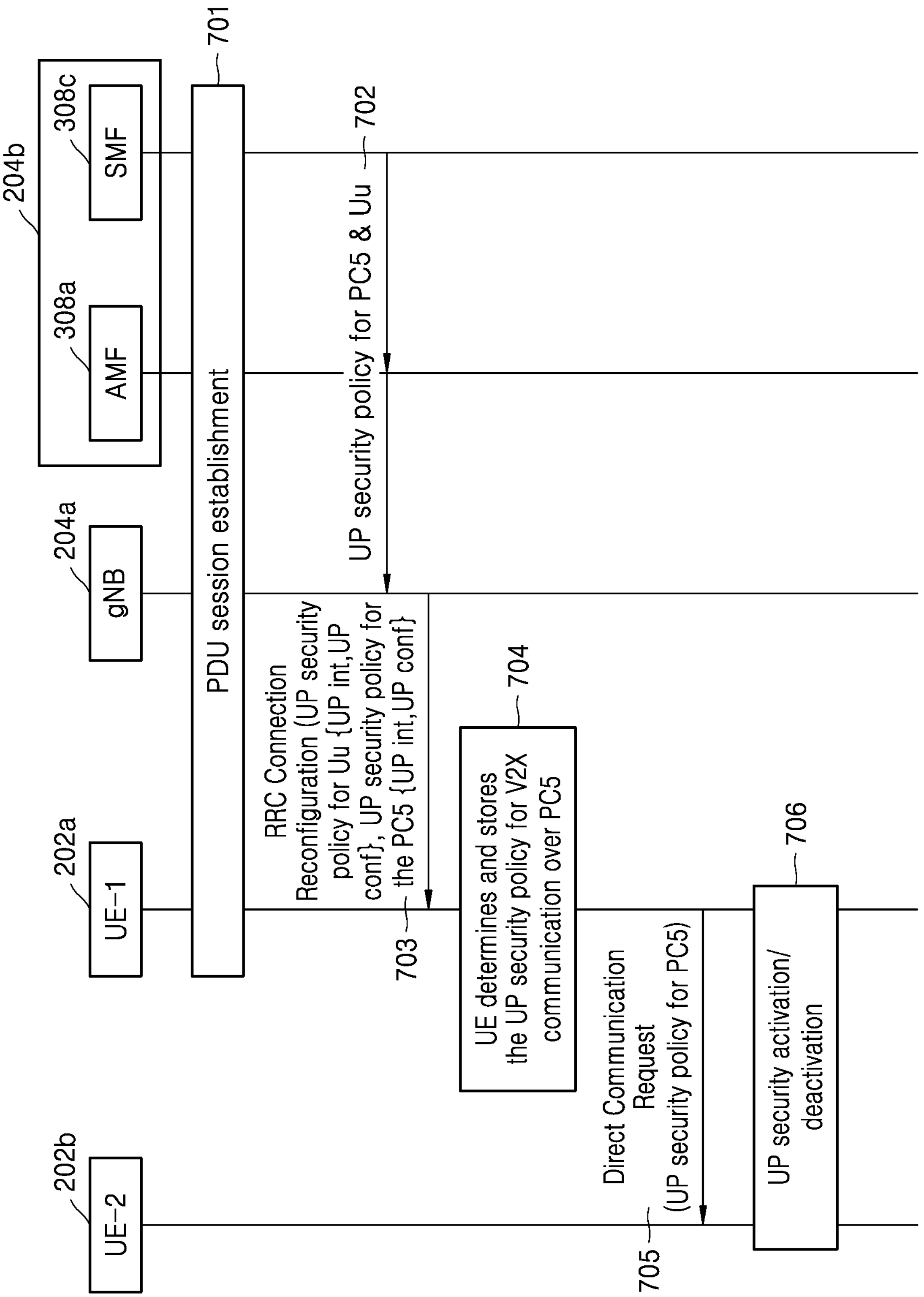
FIG. 7 is an example sequence diagram depicting a process for communicating the UP security policy provisioned for the PC5 unicast link to the UEs, according to embodiments as disclosed herein.

FIG. 7 is an example sequence diagram depicting a process for communicating the UP security policy provisioned for the PC5 unicast link to the UEs 202*a*-202*n*, according to embodiments as disclosed herein.

At step 701, the first UE 202*a* establishes the PDU session with the 5GC 204*b*. On establishing the PDU session with the 5GC 204*b*, at step 702, the SMF 308*c* of the 5GC 204*b* communicates the UP security policy for both the Uu interface and the PC5 unicast link to the BS (NG-RAN/gNB) 204*a* via for example, Namf_Communication_NIN2MessageTransfer in an N2 SM information.

At step 703, the NG-RAN 204*a* activates the UP confidentiality protection and the UP integrity protection per each Dedicated Radio Bearer (DRB), according to the received UP security policy for the Uu interface. The NG-RAN 204*a* activates the UP confidentiality protection and the UP integrity protection by sending an RRC Connection Reconfiguration message to the first UE 202*a* for activating the UP confidentiality and the UP integrity over the PC5 unicast link. The RRC Connection Reconfiguration message includes indications for the activation of the UP integrity protection and ciphering for each DRB, according to the UP security policy.

At step 704, the first UE 202*a* supporting the V2X communication over the PC5 unicast link extracts the UP security policy defined/provisioned for the one-to-one V2X communication over the PC5 unicast link. The first UE 202*a* stores the UP security policy corresponding to the PC5 unicast link for the applications for the future use.

At step 705, the first UE 202*a* initiates the one-to-one V2X communication with the second UE 202*b* over the PC5 unicast link. On initiating the V2X communication with the second UE 202*b*, the first UE 202*a* communicates the UP security policy to the second UE 202*b* over the PC5 unicast link in the direct communication request message.

At step 706, both the first UE 202*a* and the second UE 202*b* activate the UP confidentiality protection and the UP integrity protection, according to the received UP security policy for the PC5 security policy. In an embodiment, the second UE 202*b* may also obtain the UP security policy for the PC5 unicast link corresponding to the one or more applications from the 5GC 204*b* through the NG-RAN 204*a*. In another embodiment, the second UE 202*b* verifies the UP security policy indicated by the first UE 202*a* with the stored UP security for the respective application and detects if there is any discrepancy in the UP security policy indicated/received from the first UE 202*a*. If there is any discrepancy in the UP security policy received from the first UE 202*a*, the second UE 202*b* rejects the direct communication request message received from the first UE 202*a*.

Figure 8:
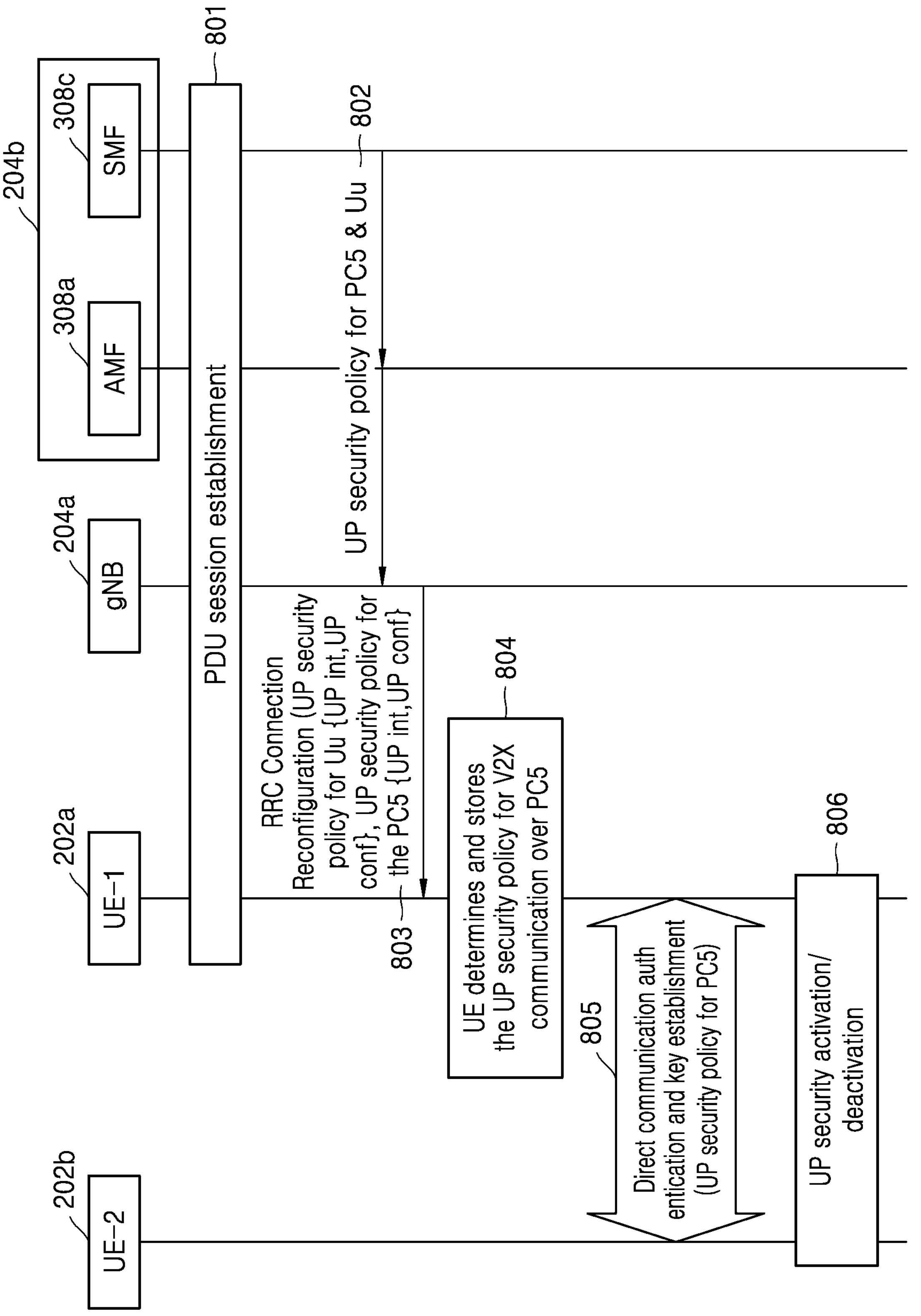
FIG. 8 is an example sequence diagram depicting another process for communicating the UP security policy defined for the PC5 unicast link to the UEs, according to embodiments as disclosed herein.

FIG. 8 is an example sequence diagram depicting another process for communicating the UP security policy defined for the PC5 unicast link to the UEs 202*a*-202*n*, according to embodiments as disclosed herein.

At step 801, the first UE 202*a* establishes the PDU session with the 5GC 204*b*. On establishing the PDU session with the 5GC 204*b*, at step 802, the SMF 308*c* of the 5GC 204*b* communicates the UP security policy for both the Uu interface and the PC5 unicast link to the BS (NG-RAN/gNB) 204*a* via for example, the Namf_Communication_NIN2MessageTransfer in the N2 SM information.

At step 803, the NG-RAN 204*a* activates the UP confidentiality protection and the UP integrity protection per each DRB, according to the received UP security policy for the Uu interface. The NG-RAN 204*a* activates the UP confidentiality protection and the UP integrity protection by sending an RRC Connection Reconfiguration message to the first UE 202*a* for activating the UP confidentiality and the UP integrity over the PC5 unicast link. The RRC Connection Reconfiguration message includes indications for the activation of the UP integrity protection and ciphering for each DRB, according to the UP security policy.

At step 804, the first UE 202*a* supporting the V2X communication over the PC5 unicast link extracts the UP security policy defined/provisioned for the one-to-one V2X communication over the PC5 unicast link. The first UE 202*a* stores the UP security policy corresponding to the PC5 unicast link for the applications for the future use.

At step 805, the first UE 202*a* shares the UP security policy with the second UE 202*b* over the PC5 unicast link during a direct communication authentication and key establishment procedure.

At step 806, the first UE 202*a* and the second UE 202*b* activate the UP confidentiality protection and the UP integrity protection, according to the UP security policy received for the PC5 unicast link.

Figure 9A:
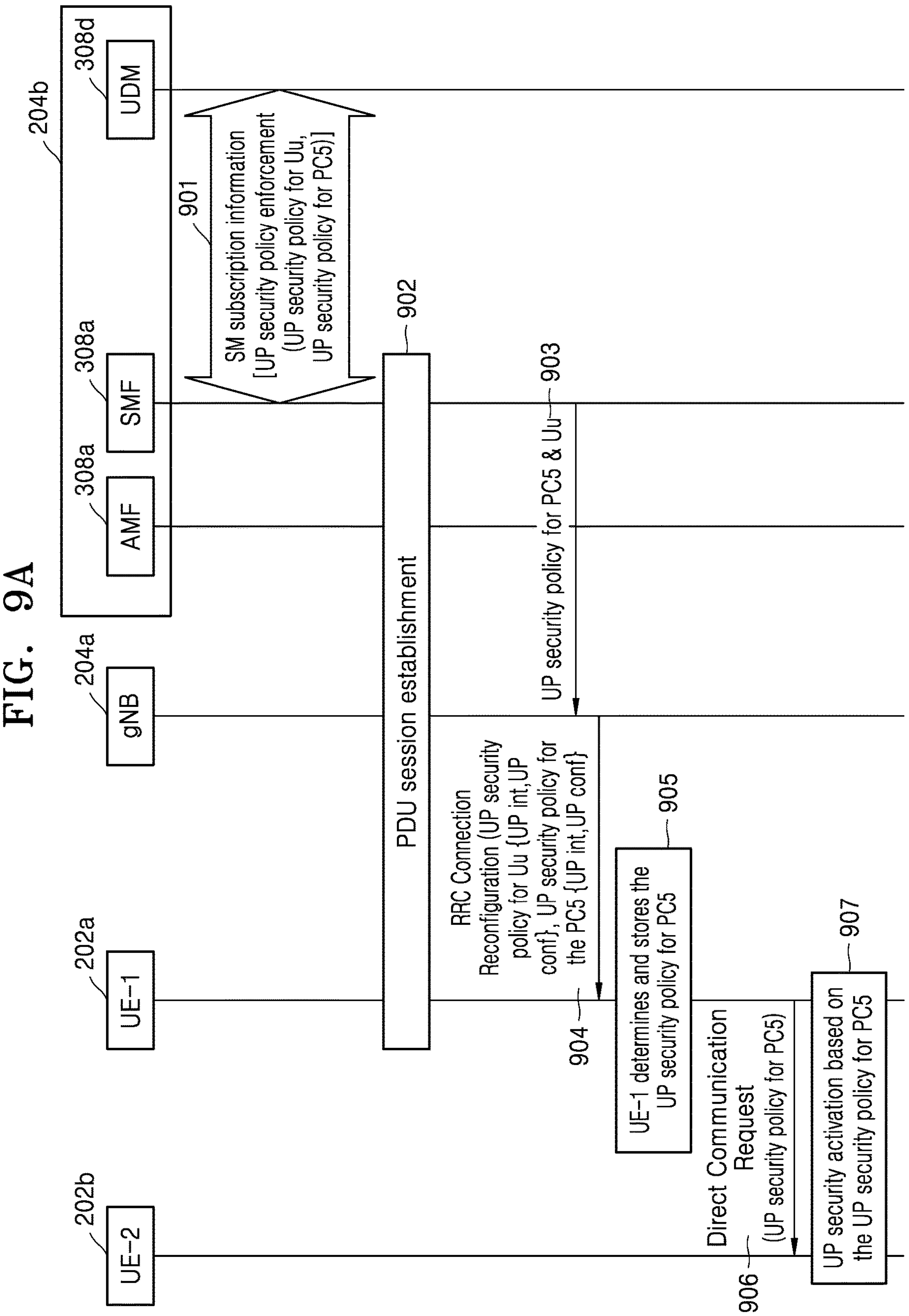
FIG. 9A is an example sequence diagrams depicting a process for communicating the UP security policy defined for the PC5 unicast link to the UEs, wherein the UP security policy is retrieved from a Unified data management through a Session Management Function (SMF) of a 5G core (5GC), according to embodiments as disclosed herein.

FIG. 9A is an example sequence diagrams depicting a process for communicating the UP security policy defined for the PC5 unicast link to the UEs (202*a*-202*n*), wherein the UP security policy is retrieved from the UDM 308*d* through the SMF 308*c* of the 5GC 204*b*, according to embodiments as disclosed herein.

In an embodiment, the UDM 308*d* of the 5GC 204*b* may be configured with the UP security policy for the PC5 unicast link along with the UP security policy for the Uu interface. The UDM 308*d* may communicate the UP security policy for both the PC5 unicast link and the Uu interface to the first UE 202*a* and/or the second UE 202*b* in a UP security enforcement information element (IE) over the N2 SM information.

At step 901, the SMF 308*c* of the 5GC 204*b* retrieves SM subscription information that includes the UP security policy for the Uu interface and the PC5 unicast link in the UP security enforcement IE.

At step 902, the first UE 202*a* establishes the PDU session with the 5GC 204*b* through the NG RAN 204*a*. On establishing the PDU session with the 5GC 204*b*.

At step 903, the SMF 308*c* communicates the UP security policy for the Uu interface and the UP security policy for the PC5 unicast link to the NG-RAN 204*a* via for example, the Namf_Communication_NIN2Message Transfer in the N2 SM information.

At step 904, the NG-RAN 204*a* activates the UP confidentiality protection and the UP integrity protection per each DRB, according to the received UP security policy. The NG-RAN 204*a* further sends the UP security policy for the Uu interface and the PC5 unicast link to the first UE 202*a* in the RRC connection reconfiguration message.

At step 905, the first UE 202*a* determines the UP security policy defined for communicating one-to-one over the PC5 unicast link from the received RRC reconfiguration message. The first UE 202*a* stores the received UP security policy for the PC5 unicast link for future use.

At step 906, the first UE 202*a* communicates the UP security policy to the second UE 202*b* over the PC5 unicast link in the direct communication request message.

Alternatively, as described below with reference to in FIG. 9B, at step 916, the first UE 202*a* shares the UP security policy to the second UE 202*b* over the PC5 unicast link during the direct communication authentication and the key establishment.

At step 907, the first UE 202*a* and the second UE 202*b* activate the UP confidentiality protection and the UP integrity protection, according to the received UP security policy.

In an embodiment, if the first UE 202*a* does not receive the UP security policy from the SMF 308*c* or the UDM 308*d* of the 5GC 204*b*, the first UE 202*a* may use the UP security policy stored as a local default configuration (configured by the ProSe function (Direct Provisioning Function). The UP security policy stored as the local default configuration may be the UP security policy defined for the PC5 unicast link along with PC5 radio configurations provided or configured by the ProSe function in a ME or in a universal integrated circuit card (UICC) of the first UE 202*a*.

If the UP security policy is stored in the UICC of the first UE 202*a*, the UICC OTA mechanism (as specified in ETSI TS 102 225/TS 102 226 and 3GPP TS 31.115/TS 31.116) may be used to secure the transfer of the UP security policy to be updated in the UICC.

Figure 9B:
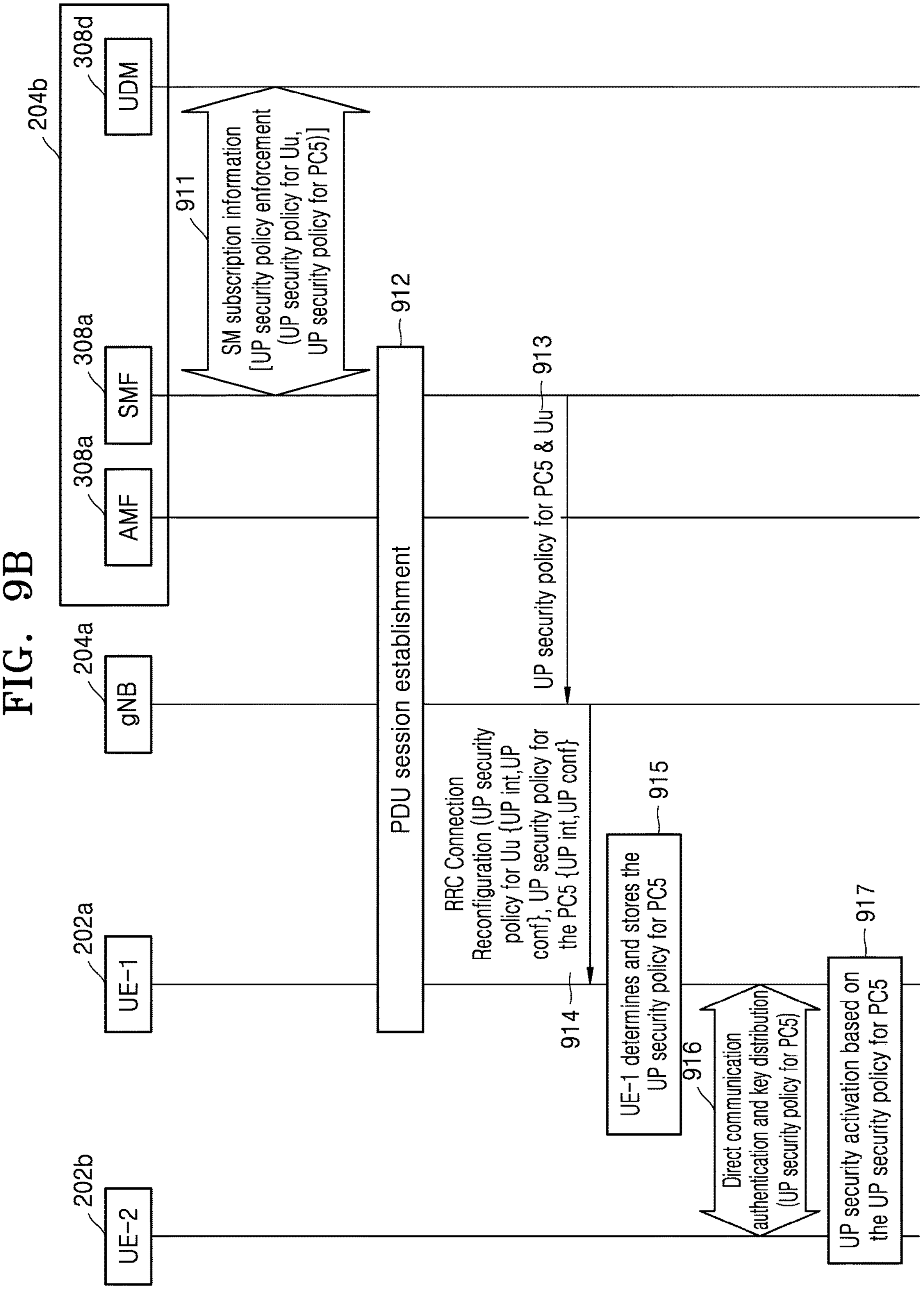
FIG. 9B is an example sequence diagrams depicting another process for communicating the UP security policy defined for the PC5 unicast link to the UEs.

FIG. 9B is an example sequence diagrams depicting another process for communicating the UP security policy defined for the PC5 unicast link to the UEs.

In an embodiment, the UP security policy is retrieved from the UDM 308*d* through the SMF 308*c* of the 5GC 204*b*, according to embodiments as disclosed herein.

In an embodiment, the UDM 308*d* of the 5GC 204*b* may be configured with the UP security policy for the PC5 unicast link along with the UP security policy for the Uu interface. The UDM 308*d* may communicate the UP security policy for both the PC5 unicast link and the Uu interface to the first UE 202*a* and/or the second UE 202*b* in a UP security enforcement information element (IE) over the N2 SM information.

At step 911, the SMF 308*c* of the 5GC 204*b* retrieves SM subscription information that includes the UP security policy for the Uu interface and the PC5 unicast link in the UP security enforcement IE.

At step 912, the first UE 202*a* establishes the PDU session with the 5GC 204*b* through the NG RAN 204*a*. On establishing the PDU session with the 5GC 204*b*.

At step 913, the SMF 308*c* communicates the UP security policy for the Uu interface and the UP security policy for the PC5 unicast link to the NG-RAN 204*a* via for example, the Namf_Communication_NIN2Message Transfer in the N2 SM information.

At step 914, the NG-RAN 204*a* activates the UP confidentiality protection and the UP integrity protection per each DRB, according to the received UP security policy. The NG-RAN 204*a* further sends the UP security policy for the Uu interface and the PC5 unicast link to the first UE 202*a* in the RRC connection reconfiguration message.

At step 915, the first UE 202*a* determines the UP security policy defined for communicating one-to-one over the PC5 unicast link from the received RRC reconfiguration message. The first UE 202*a* stores the received UP security policy for the PC5 unicast link for future use.

At step 916, the first UE 202*a* shares the UP security policy to the second UE 202*b* over the PC5 unicast link during the direct communication authentication and the key establishment.

At step 917, the first UE 202*a* and the second UE 202*b* activate the UP confidentiality protection and the UP integrity protection, according to the received UP security policy.

In an embodiment, if the first UE 202*a* does not receive the UP security policy from the SMF 308*c* or the UDM 308*d* of the 5GC 204*b*, the first UE 202*a* may use the UP security policy stored as a local default configuration (configured by the ProSe function (Direct Provisioning Function). The UP security policy stored as the local default configuration may be the UP security policy defined for the PC5 unicast link along with PC5 radio configurations provided or configured by the ProSe function in a ME or in a universal integrated circuit card (UICC) of the first UE 202*a*.

If the UP security policy is stored in the UICC of the first UE 202*a*, the UICC OTA mechanism (as specified in ETSI TS 102 225/TS 102 226 and 3GPP TS 31.115/TS 31.116) may be used to secure the transfer of the UP security policy to be updated in the UICC.

Figure 10:
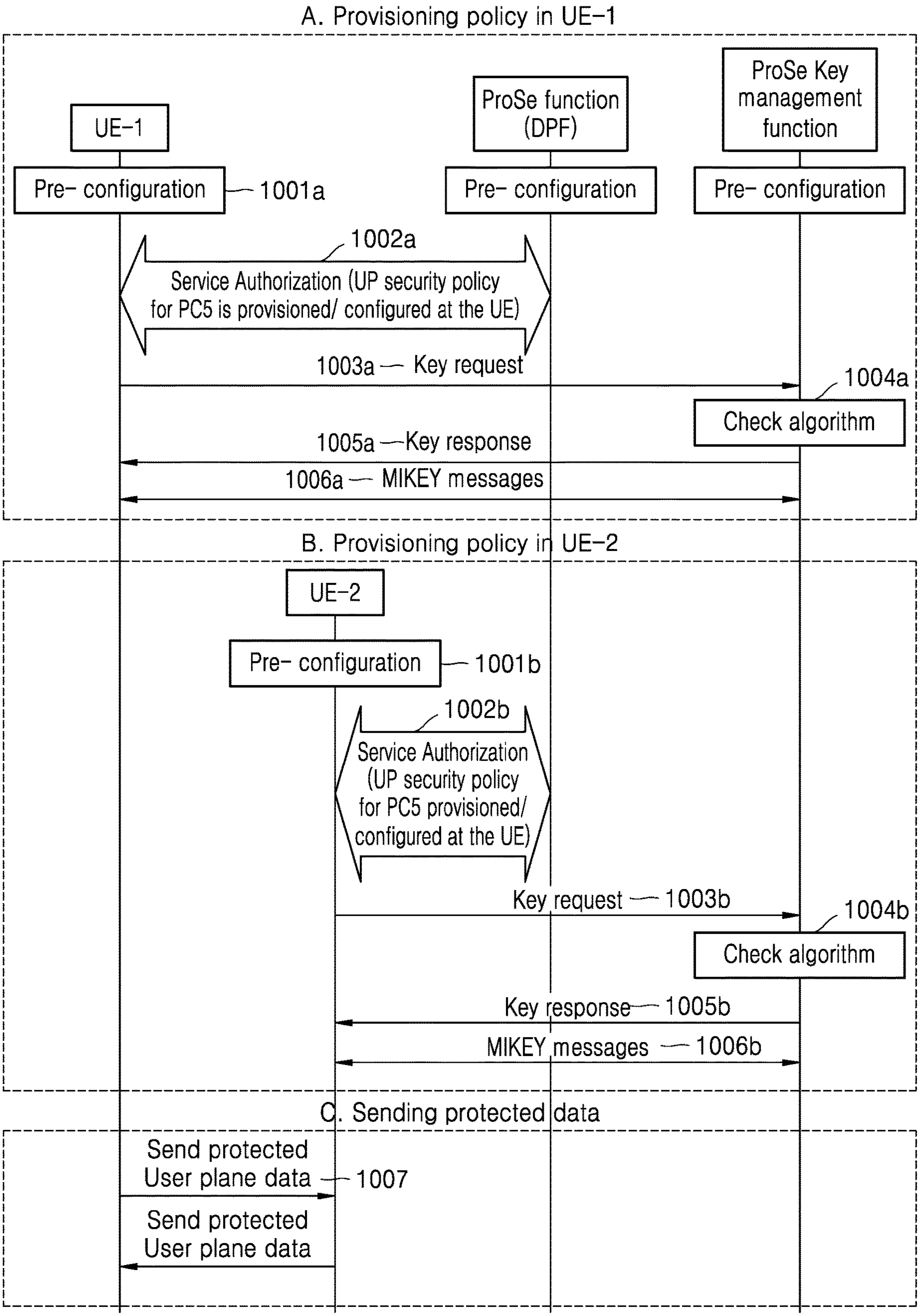
FIG. 10 is an example sequence diagram depicting a process for configuring the UP security policy for the PC5 unicast link by a Proximity Service function, according to the embodiments as disclosed herein.

FIG. 10 is an example sequence diagram depicting a process for configuring the UP security policy for the PC5 unicast link by a Proximity Service (ProSe) function, according to the embodiments as disclosed herein.

The ProSe function is a logical entity in each Public Land Mobile Network (PLMN) that supports Proximity services. In an embodiment, the ProSe function may provision the UP security policy for the PC5 unicast link during the service authorization of the first UE 202*a* and the second UE 202*b* (for one-to-many V2X communication).

Embodiments herein enable the ProSe function to provision the UP security policy for the PC5 unicast link in the first UE 202*a*.

At step 1001*a*, the first UE 202*a* may be configured with one-to-many V2X communication parameters to contact a ProSe Key Management Function, which is an entity that allows a network operator to radio level parameter and to provision keys. Examples of the one-to-many V2X communication parameters may be, but are not limited to, private keys, associated certificates or root certificate and address of the ProSe Key Management Function. The ProSe function and the ProSe Key Management Function may be configured with each subscription of the V2X service.

At step 1002*a*, the first UE 202*a* fetches the one-to-many V2X communication parameters and the UP security policy from the ProSe Function. As a part of such procedure, the first UE 202*a* obtains the UP security policy for the PC5 unicast link.

At step 1003*a*, the first UE 202*a* sends, to the ProSe Key Management Function, a key request message including a UE group identity (if one-to-many) of a group (of UEs) for which the first UE 202*a* wants to fetch the keys and UE security capabilities.

At step 1004*a*, the ProSe Key Management Function checks, whether the encryption/integrity algorithm is supported by the first UE 202*a*, according to the UE security capabilities.

At step 1005*a*, the ProSe Key Management Function communicates a Key Response message to first UE 202*a*, if the first UE 202*a* supports the encryption/integrity method/algorithm, according to the UE security capabilities. The Key Response Message includes a group member identity and a security algorithm identifier, that the first UE 202*a* has to use while sending or receiving protected data for the respective group.

At step 1006*a*, the ProSe Key Management Function send the relevant ProSe Group Keys, PGK IDs (key Identifier that identifies ProSe Group Key definition, which may be same as a key set identifier defined in 3GPP specification TS 33.501 v17.0.0), and an expiry time to the first UE 202*a* using multimedia internet keying (MIKEY).

Embodiments herein enable the ProSe function to provision the UP security policy for the PC5 unicast link in the second UE 202*b*.

At step 1001*b*, the second UE 202*b* may be configured with the one-to-many V2X communication parameters to contact the ProSe Key Management Function. The ProSe Function and the ProSe Key Management Function may be configured with the subscriptions of the V2X service.

At step 1002*b*, the second UE 202*b* fetches the one-to-many V2X communication parameters and/or the UP security policy from the ProSe Function. As a part of such procedure, the second UE 202*b* obtains the UP security policy for the PC5 unicast link.

At step 1003*b*, the second UE 202*b* sends, to the ProSe Key Management Function, the Key Request message including the group identity (if one-to-many) of the group for which the second UE 202*b* wants to fetch the keys and the UE security capabilities.

At step 1004*b*, the ProSe Key Management Function checks if the encryption/integrity algorithm is supported by the second UE 202*b*, according to the UE security capabilities.

At step 1005*b*, the ProSe Key Management Function communicates the Key Response Message to the second UE 202*b*, if the second UE 202*b* supports the encryption/integrity method/algorithm. The Key Response message includes the Group Member Identity and the security algorithm identifier that the second UE 202*b* may use, while sending or receiving protected data for the respective group.

At step 1006*b*, the ProSe Key Management Function sends the relevant ProSe Group Keys, PGK IDs and expiry time to the second UE 202*b* using the MIKEY.

Embodiments herein enable the first UE 202*a* and the second UE 202*b* to exchange the protected data with the group member UE using the provisioned UP security policy.

At step 1007, the first UE 202*a* and the second UE 202*b* calculate a ProSe Traffic Key (PTK) and a ProSe Encryption Key (PEK) to protect the data traffic that is to be sent to the group member UE. The first UE 202*a* and the second UE 202*b* then protect the data traffic using the encryption/integrity method negotiated between the group member UE and the ProSe Function.

Figure 11:
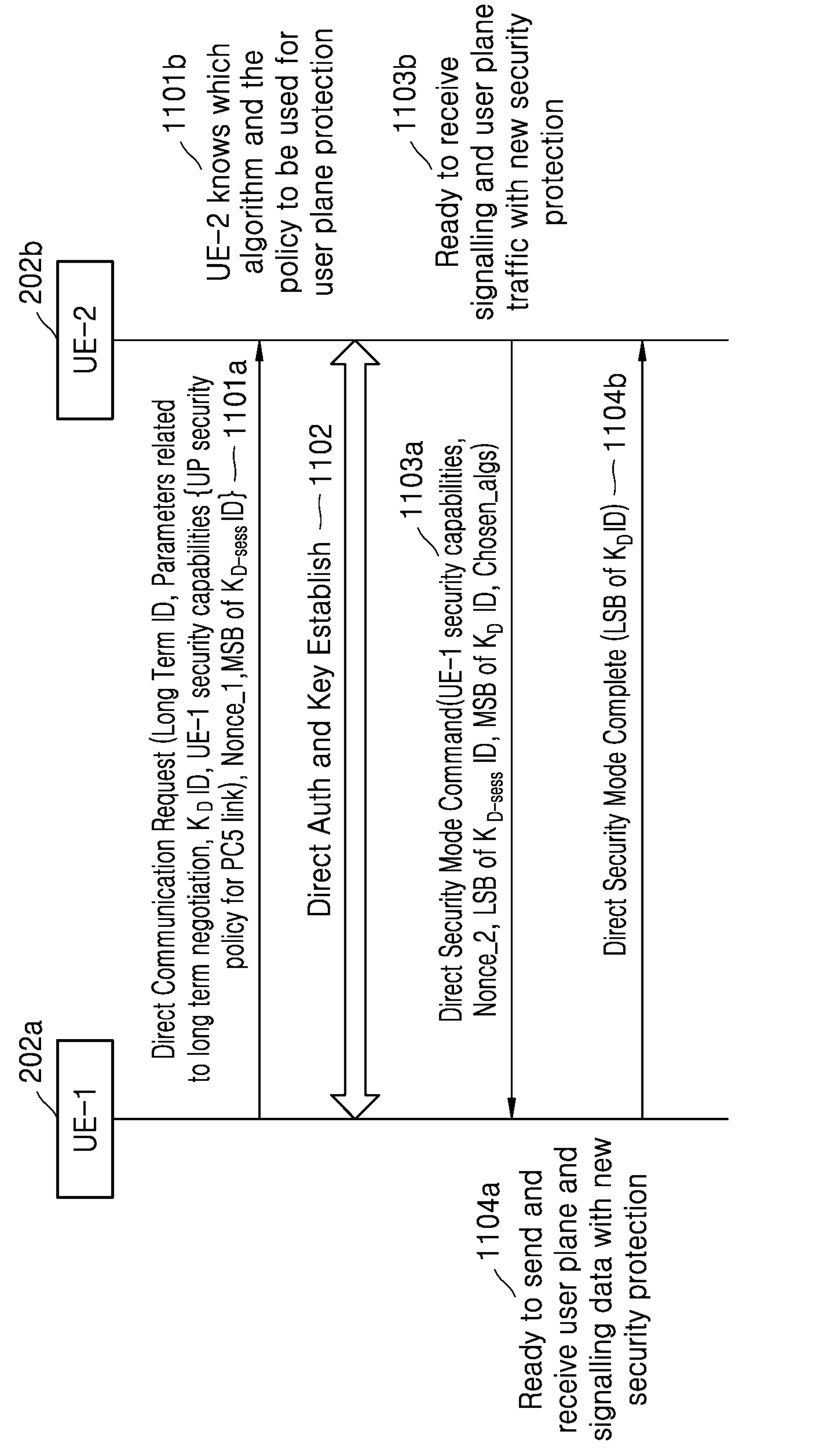
FIG. 11 is an example sequence diagram depicting a process for sharing the UP security policy for the PC5 unicast link between UEs, according to embodiments as disclosed herein.

FIG. 11 is an example sequence diagram depicting a process for sharing the UP security policy for the PC5 unicast link between the first UE 202*a* and the second UE 202*b*, according to embodiments as disclosed herein.

At step 1101*a*, the first UE 202*a* sends the direct communication message to the second UE 202*b*. The direct communication message includes Nonce_1 (for session key generation), the UE security capabilities of the first UE 202*a* (i.e., the list of encryption/integrity methods accepted for this connection), indicators for activating the UP integrity protection and ciphering, according to the provisioned UP security policy and most significant 8-bits of a $K_{D\text{-}session}$ ID, and so on. The most significant 8-bits of the $K_{D\text{-}session}$ ID may be selected such that the first UE 202*a* may be able to locally identify a security context that may be created using the direct authentication and key establishment procedure. The direct communication message may also include a $K_D$ ID (which Identifies the $K_D$ Key), if the first UE 202*a* has an existing $K_D$ with the second UE 202*b* with which the first UE 202*a* wants to communicate. The absence of the $K_D$ ID parameter indicates that the first UE 202*a* does not have a $K_D$ for the second UE 202*b*. Further, a long term ID may be the information needed by the first UE 202*a* in order to retrieve the right long term key.

At step 1101*b*, the second UE 202*b* determines the encryption/integrity method and the UP security policy that is to be used for the protection of the user plane traffic.

At step 1102, the second UE 202*b* initiates the direct authentication and key establishment procedure with the first UE 202*a*. The second UE 202*b* has to initiate the direct authentication and key establishment procedure, if the second UE 202*b* does not have the $K_D$ and the $K_D$ ID pair depicted in the step 1201*a* and if signaling is required for establishing the keys for a particular use case.

At step 1103*a*, the second UE 202*b* sends a Direct Security Mode Command to the first UE 202*a*. The Direct Security Mode Command includes the most significant bits of the KD ID, if a fresh KD is generated. Further, a Nonce_2 to allow a session key to be calculated and the chosen parameter to indicate which security methods/algorithms (the ciphering and integrity method as defined in 3GPP specification TS 33.501 v17.0.0), the first and second UEs (202*a*, 202*b*) have to use for protecting the user plane traffic data. The included bits of the $K_D$ ID may uniquely identify the $K_D$ at the second UE 202*b*. The second UE 202*b* may return the first UE 202*a* the security capabilities to provide protection against bidding down attacks. The second UE 202*b* also includes least significant 8-bits of the $K_D$ session ID in the messages. The least significant 8-bits may be chosen in such a way that the second UE 202*b* may be able to locally identify a security context that is created by the direct authentication and key establishment procedure. The second UE 202*b* calculates the $K_{D\text{-}session}$ from the $K_D$ and the Nonce_1 and the Nonce_2 and derives the confidentiality and integrity keys based on the chosen algorithm.

In an embodiment, alternatively/additionally, if the security indications for the UP security activation is not present or if the second UE 202*b* selects a different security policy, then the step 1103*a* includes details for the UP security activation including indications for the activation of UP integrity protection and ciphering for each DRB according to the stored/selected security policy.

At step 1103*b*, the second UE 202*b* integrity protects the Direct Security Mode Command before sending to the first UE 202*a*. The second UE 202*b* then may be ready to receive both the signaling and the user plane traffic protected with the new security context. The second UE 202*b* forms the $K_{D\text{-}session}$ ID from the most significant bits that have been received in the Direct communication request message and the LSBs that have been sent in the Direct security mode command message.

On receiving the Direct Security Mode Command, at step 1104*a* and 1104*b*, the first UE 202*a* calculates the KD-session and the confidentiality and integrity keys in the same way as the second UE 202*b*. The first UE 202*a* checks if the returned first UE 202*a* security capabilities from the second UE 202*b* are the same as the security capabilities shared by the first UE 202*a* with the second UE 202*b* in the step 1101*a*. The first UE 202*a* also checks the integrity protection on the message. If both the checks are successful, the first UE 202*a* then gets ready to send and receive signaling and user traffic with a new security context. If the most significant bits of the KD ID have been included in the Direct Security Mode Command, the first UE 202*a* generates the least significant bits of the KD ID such that the least significant bits uniquely identify the KD at the first UE 202*a* and stores the complete KD ID with the KD. The first UE 202*a* sends an integrity protected and confidentiality protected (with the chosen algorithm, which may be the null algorithm) Direct Security Mode Complete message to the second UE 202*b*. The first UE 202*a* includes the least significant bits of the KD ID in the message. The first UE 202*a* forms the KD-session ID from the most significant bits that have been sent in the message 1 and the least significant bits received in the message 3.

Embodiments herein define a User Plane (UP) security policy for a PC5 unicast link and an Uu interface independently for an application in V2X communication and enforce the defined UP security policy based on the UP security policy provided by a network.

Embodiments herein enable the network to define the UP security policy for the PC5 unicast link, where a UP integrity protection and UP confidentiality protection may be indicated as one of, "required", "preferred", and "not needed". The UP security policy may be provisioned by a policy control function (PCF) during service authorization and information provisioning on per V2X application or per PC5 unicast link granularity. The UP security policy for the PC5 unicast link may be shared with peer User Equipment (UE) during direct communication establishment/Layer-2 link establishment/Layer-2 link modification procedure. Mismatch or any discrepancy of the UP security policy may lead to termination/rejection of a communication link set up between the UEs.

Figure 12:
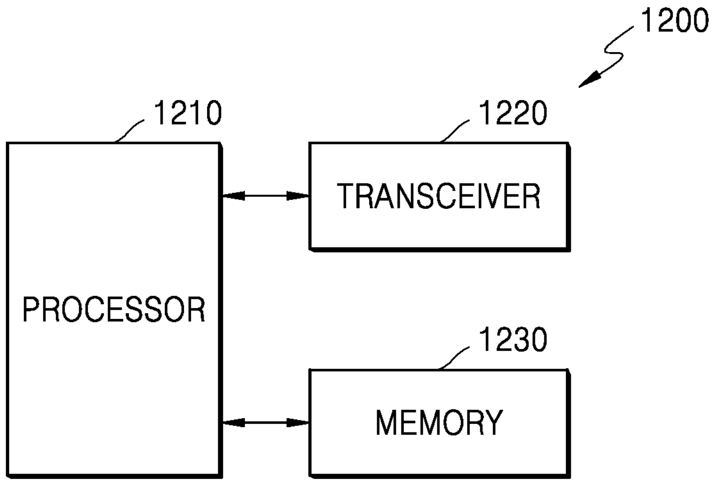
FIG. 12 is a diagram illustrating a UE according to an embodiment of the present disclosure.

FIG. 12 is a diagram illustrating a UE 1200 according to an embodiment of the present disclosure.

Referring to the FIG. 12, the UE 1200 may include a processor 1210, a transceiver 1220 and a memory 1230. However, all of the illustrated components are not essential. The UE 1200 may be implemented by more or less components than those illustrated in the FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the UE 1200 may be implemented by the processor 1210.

The transceiver 1220 may be connected to the processor 1210 and transmit and/or receive a signal. In addition, the transceiver 1220 may receive the signal through a wireless channel and output the signal to the processor 1210. The transceiver 1220 may transmit the signal output from the processor 1210 through the wireless channel.

The memory 1230 may store the control information or the data included in a signal obtained by the UE 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

Figure 13:
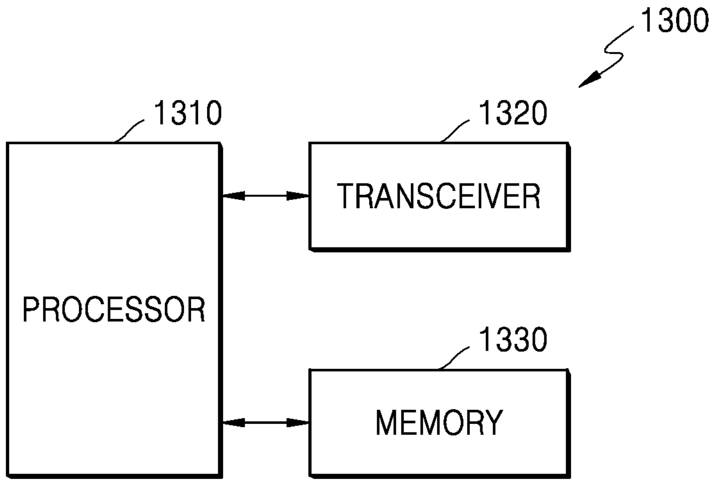
FIG. 13 is a diagram illustrating a base station according to an embodiment of the present disclosure.

FIG. 13 is a diagram illustrating a base station 1300 according to an embodiment of the present disclosure.

Referring to the FIG. 13, the base station 1300 may include a processor 1310, a transceiver 1320 and a memory 1330. However, all of the illustrated components are not essential. The base station 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the base station 1300 may be implemented by the processor 1310.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the base station 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Figure 14:
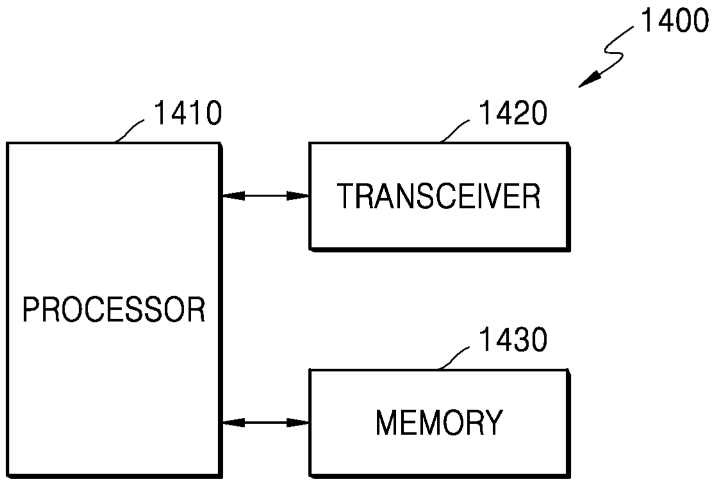
FIG. 14 illustrates a core network entity according to embodiments of the present disclosure.

FIG. 14 schematically illustrates a core network entity according to embodiments of the present disclosure.

The CN 204*b* described above may correspond to the core network entity 1400.

Referring to the FIG. 14, the core network entity 1400 may include a processor 1410, a transceiver 1420 and a memory 1430. However, all of the illustrated components are not essential. The core network entity 1400 may be implemented by more or less components than those illustrated in FIG. 14. In addition, the processor 1410 and the transceiver 1420 and the memory 1430 may be implemented as a single chip according to another embodiment.

The aforementioned components will now be described in detail.

The transceiver 1420 may provide an interface for performing communication with other devices in a network. That is, the transceiver 1420 may convert a bitstream transmitted from the core network entity 1400 to other devices to a physical signal and covert a physical signal received from other devices to a bitstream. That is, the transceiver 1420 may transmit and receive a signal. The transceiver 1420 may be referred to as modem, transmitter, receiver, communication unit and communication module. The transceiver 1420 may enable the core network entity 1400 to communicate with other devices or system through backhaul connection or other connection method.

The memory 1430 may store a basic program, an application program, configuration information for an operation of the core network entity 1000. The memory 1430 may include volatile memory, non-volatile memory and a combination of the volatile memory and the non-volatile memory. The memory 1030 may provide data according to a request from the processor 1410.

The processor 1410 may control overall operations of the core network entity 1400. For example, the processor 1410 may transmit and receive a signal through the transceiver 1420. The processor 1410 may include at least one processor. The processor 1410 may control the core network entity 1400 to perform operations according to embodiments of the present disclosure.

In accordance with an embodiment of the present disclosure, a method for handling security policies in a Vehicle-to-Everything (V2X) communication system 200 may be provided.

The method may comprise: receiving, by a Core Network (CN) 204*b*, a registration request message from a first User Equipment (UE) 202*a*, when the first UE 202*a* wants to initiate a unicast communication with a second UE 202*b* over a PC5 unicast link; provisioning, by the CN 204*b*, at least one User Plane (UP) security policy for the PC5 unicast link; and sending, by the CN 204*b*, the provisioned at least one UP security policy to the first UE 202*a* for initiating the unicast communication with the second UE 202*b* over the PC5 unicast link.

In an embodiment, wherein provisioning, by the CN 204*b*, the at least one UP security policy for the PC5 unicast link may include: identifying at least one of, PC5 capabilities of the first UE 202*a*, at least one application supported by the first UE 202*a*, and at least one service supported by each application from the registration request message received from the first UE 202*a*; and provisioning the at least one UP security policy for the PC5 unicast link based on at least one of, the identified PC5 capabilities of the first UE 202*a*, the at least one application supported by the first UE 202*a*, and the at least one service supported by each application of the first UE 202*a*.

In an embodiment, wherein a Policy Control Function (PCF) 308*b* of the CN 204*b* provisions the at least one UP security policy for the PC5 unicast link.

In an embodiment, wherein provisioning the at least one UP security policy for the PC5 unicast link includes one of, provisioning the at least one UP security policy for each application or each service supported by the first UE 202*a* over the PC5 unicast link; or provisioning the at least one UP security policy for each PC5 unicast link for initiating V2X communication or ProSe communication between the first UE 202*a* and the second UE 202*b*.

In an embodiment, wherein each of the at least one service supported by each application of the first UE 202*a* uses the same PC5 unicast link.

In an embodiment, wherein the at least one UP security policy provisioned for the PC5 unicast link indicates a requirement of activation or deactivation of at least one of, UP integrity protection and UP confidentiality protection on data traffic to be communicated between the first UE 202*a* and the second UE 202*b* over the PC5 unicast link, wherein the data traffic corresponds to data of the at least one application or the at least one service supported by the first UE 202*a* and the second UE 202*b*.

In an embodiment, wherein the requirement of activation or deactivation of at least one of the UP integrity protection and the UP confidentially protection is indicated using one of, a "required" field, a "preferred" field and a "not needed" field.

In an embodiment, wherein the "required" field indicates that at least one of the UP integrity protection and the UP confidentially protection has to be activated for the data traffic to be communicated between the first UE 202*a* and the second UE 202*b* over the PC5 unicast link; the "preferred" field indicates that the at least one of the UP integrity protection and the UP confidentially protection has to be activated for the data traffic to be communicated between the first UE 202*a* and the second UE 202*b* over the PC5 unicast link, only if the second UE 202*b* wants to activate at least one of the UP integrity protection and the UP confidentiality protection; and the "not needed" field indicates that the activation of the at least one of the UP integrity protection and the UP confidentially protection is not required on the data traffic to be communicated between the first UE 202*a* and the second UE 202*b* over the PC5 unicast link.

In an embodiment, the method may further comprise: transmitting, by the first UE 202*a*, the provisioned at least one UP security policy for the PC5 unicast link to the second UE 202*b* for a direct communication establishment corresponding to the at least one application; and terminating, by the second UE 202*b*, the communication establishment with the first UE 202*a*, on detecting discrepancy in the at least one UP security policy received from the first UE 202*a*.

In an embodiment, wherein detecting, by the second UE 202*b*, the discrepancy in the at least one UP security policy received from the first UE 202*a* may include: comparing the at least one UP security policy applied on the data traffic corresponding to the at least one application with the provisioned at least one UP security policy received from the first UE 202*a*; and detecting the discrepancy in the at least one UP security policy received from the first UE 202*a*, if the applied at least one UP security policy does not match with the at least one UP security policy received from the first UE 202*a*.

In an embodiment, the method may further comprise: creating, by the CN 204*b*, a one-to-one mapping between the at least one UP security policy of the PC5 unicast link and at least one UP security policy of a Uu interface, wherein creating the one-to-one mapping may include: re-configuring a Packet Data Convergence Protocol (PDCP) instance created for the Uu interface to a PDCD instance of the PC5 unicast link, by changing at least one parameter of the PC5 unicast link and retaining the at least one UP security policy configured in the PDCP instance of the PC5 unicast link, wherein at least one parameter of the PC5 unicast link includes at least one of, a logic channel identifier (LCID), security keys, and PDCP counts.

In accordance with an embodiment of the present disclosure, a Vehicle-to-Everything (V2X) communication system 200 may comprise: a plurality of User Equipments 202*a*-202*n*; and at least one Radio Access Technology (RAT) 204, wherein each RAT includes a Radio Access Network (RAN) node 204*a* and a Core Network (CN) 204*b*, wherein the CN 204*b* is configured to: receive a registration request message from a first UE 202*a* of the plurality of UEs 202*a*-202*n*, when the first UE 202*a* wants to initiate a unicast communication with a second UE 202*b* of the plurality of UEs 202*a*-202*n* over a PC5 unicast link; provision at least one User Plane (UP) security policy for the PC5 unicast link; and send the provisioned at least one UP security policy to the first UE 202*a* for initiating the unicast communication with the second UE 202*b* over the PC5 unicast link.

In an embodiment, wherein the CN 204*b* is further configured to: identify at least one of, PC5 capabilities of the first UE 202*a*, at least one application supported by the first UE 202*a*, and at least one service supported by each application from the registration request message received from the first UE 202*a*; and provision the at least one UP security policy for the PC5 unicast link based on at least one of, the identified PC5 capabilities of the first UE 202*a*, the at least one application supported by the first UE 202*a*, and the at least one service supported by each application of the first UE 202*a*.

In an embodiment, wherein a Policy Control Function (PCF) 308*b*, of the CN 204*b* provisions the at least one UP security policy for the PC5 unicast link.

In an embodiment, wherein provisioning the at least one UP security policy for the PC5 unicast link may include one of, provisioning the at least one UP security policy for each application supported by the first UE 202*a* over the PC5 unicast link; or provisioning the at least one UP security policy for each PC5 unicast link for initiating V2X communication or ProSe communication between the first UE 202*a* and the second UE 202*b*.

In an embodiment, wherein each of the at least one service supported by each application of the first UE 202*a* uses the same PC5 unicast link.

In an embodiment, wherein the at least one UP security policy provisioned for the PC5 unicast link indicates a requirement of activation or deactivation of at least one of, UP integrity protection and UP confidentiality protection on data traffic to be communicated between the first UE 202*a* and the second UE 202*b* over the PC5 unicast link, wherein the data traffic corresponds to data of the at least one application or the at least one service supported by the first UE 202*a* and the second UE 202*b*.

In an embodiment, wherein the requirement of activation or deactivation of at least one of the UP integrity protection and the UP confidentially protection is indicated using one of, a "required" field, a "preferred" field and a "not needed" field.

In an embodiment, wherein the "required" field indicates that at least one of the UP integrity protection and the UP confidentially protection has to be activated for the data traffic to be communicated between the first UE 202*a* and the second UE 202*b* over the PC5 unicast link; the "preferred field" indicates that the at least one of the UP integrity protection and the UP confidentially protection has to be activated for the data traffic to be communicated between the first UE 202*a* and the second UE 202*b* over the PC5 unicast link, only if the second UE 202*b* wants to activate at least one of the UP integrity protection and the UP confidentiality protection; and the "not needed field" indicates that the activation of the at least one of the UP integrity protection and the UP confidentially protection is not required on the data traffic to be communicated between the first UE 202*a* and the second UE 202*b* over the PC5 unicast link.

In an embodiment, wherein the first UE 202*a* is configured to: transmit the provisioned at least one UP security policy for the PC5 unicast link to the second UE 202*b* for a direct communication establishment corresponding to the at least one application; and wherein the second UE 202*b* is configured to: terminate the communication establishment with the first UE 202*a*, on detecting discrepancy in the at least one UP security policy received from the first UE 202*a*.

In an embodiment, wherein the second UE 202*b* is further configured to: compare the at least one UP security policy applied on the data traffic corresponding to the at least one application with the provisioned at least one UP security policy received from the first UE 202*a*; and detect the discrepancy in the at least one UP security policy received from the first UE (202*a*), if the applied at least one UP security policy does not match with the at least one UP security policy received from the first UE 202*a*.

In an embodiment, wherein the CN 204*b* is further configured to create a one-to-one mapping between the at least one UP security policy of the PC5 unicast link and at least one UP security policy of a Uu interface, wherein creating the one-to-one mapping by: re-configuring a Packet Data Convergence Protocol (PDCP) instance created for the Uu interface to a PDCD instance of the PC5 unicast link, by changing at least one parameter of the PC5 unicast link and retaining the at least one UP security policy configured in the PDCP instance of the PC5 unicast link, wherein at least one parameter of the PC5 unicast link includes at least one of, a logic channel identifier (LCID), security keys, and PDCP counts.

In accordance with an embodiment of the present disclosure, a Core Network (CN) 204*b* in a Vehicle-to-Everything V2X communication system 200 may comprise: at least one functional node 308*b* configured to: receive a registration request message from a first User Equipment (UE) 202*a* through an associated Radio Access Network (RAN) node 204*a*, when the first UE 202*a* wants to initiate a unicast communication with a second UE 202*b* over a PC5 unicast link; provision at least one User Plane (UP) security policy for the PC5 unicast link based on at least one of, PC5 capabilities of the first UE 202*a*, at least one application supported by the first UE 202*a*, and at least one service supported by each application; and send the provisioned at least one UP security policy and to the first UE 202*a* for initiating the unicast communication with the second UE 202*b* over the PC5 unicast link.

In an embodiment, wherein the at least one functional node 308*b* includes a Policy Control Function (PCF).

In an embodiment, wherein the at least one UP security policy provisioned for the PC5 unicast link indicates a requirement of activation or deactivation of at least one of, UP integrity protection and UP confidentiality protection on data traffic to be communicated between the first UE 202*a* and the second UE 202*b* over the PC5 unicast link, wherein the data traffic corresponds to data of the at least one application supported by the first UE 202*a* and the second UE 202*b*.

In an embodiment, wherein the requirement of activation or deactivation of at least one of the UP integrity protection and the UP confidentially protection is indicated using one of, a "required" field, a "preferred" field and a "not needed" field.

In an embodiment, wherein the "required" field indicates that at least one of the UP integrity protection and the UP confidentially protection has to be activated for the data traffic to be communicated between the first UE 202*a* and the second UE 202*b* over the PC5 unicast link; the "preferred" field indicates that the at least one of the UP integrity protection and the UP confidentially protection has to be activated for the data traffic to be communicated between the first UE 202*a* and the second UE 202*b* over the PC5 unicast link, only if the second UE wants to activate at least one of the UP integrity protection and the UP confidentiality protection; and the "not needed" field indicates that the activation of the at least one of the UP integrity protection and the UP confidentially protection is not required on the data traffic to be communicated between the first UE and the second UE over the PC5 unicast link.

In accordance with an embodiment of the present disclosure, a method performed by a first terminal performing vehicle-to-everything (V2X) communication with a second terminal via one or more PC5 unicast links in a wireless communication system is provided. The method may comprise: receiving, from a core network entity, information on one or more security policies respectively corresponding to the one or more PC5 unicast links, wherein each of the one or more PC5 unicast links is associated with one or more V2X services; transmitting, to the second terminal, a direct communication request message including the one or more security policies for initiating the V2X communication; and in case that the transmitted direct communication request message is accepted by the second terminal, activating a security of each of the one or more PC5 unicast links based on the received information on the one or more security policies.

In an embodiment, wherein the one or more V2X services using the same PC5 unicast link are associated with the same V2X application.

In an embodiment, wherein each of the one or more security policies includes information associated with a user plane integrity protection and information associated with a user plane confidentiality protection.

In an embodiment, wherein the information associated with the user plane integrity protection indicates whether the user plane integrity protection is required, preferred, or not needed.

In an embodiment, wherein the information associated with the user plane confidentiality protection indicates whether the user plane confidentiality protection is required, preferred, or not needed.

In an embodiment, wherein the transmitted communication request message is rejected by the second terminal in case that the one or more security policies included in the transmitted communication request message mismatch with one or more security policies associated with the second terminal.

In an embodiment, wherein the information on the one or more security policies is received from the core network entity during a service authorization and information provisioning procedure.

In accordance with an embodiment of the present disclosure, a first terminal for performing vehicle-to-everything (V2X) communication with a second terminal via one or more PC5 unicast links in a wireless communication system is provided. The first terminal may comprise: a transceiver; and at least one processor configured to: receive, from a core network entity via the transceiver, information on one or more security policies respectively corresponding to the one or more PC5 unicast links, wherein each of the one or more PC5 unicast links is associated with one or more V2X services; transmit, to the second terminal via the transceiver, a direct communication request message including the one or more security policies for initiating the V2X communication; and in case that the transmitted direct communication request message is accepted by the second terminal, activate a security of each of the one or more PC5 unicast links based on the received information on the one or more security policies.

In an embodiment, wherein the one or more V2X services using the same PC5 unicast link are associated with the same V2X application.

In an embodiment, wherein each of the one or more security policies includes information associated with a user plane integrity protection and information associated with a user plane confidentiality protection.

In an embodiment, wherein the information associated with the user plane integrity protection indicates whether the user plane integrity protection is required, preferred, or not needed.

In an embodiment, wherein the information associated with the user plane confidentiality protection indicates whether the user plane confidentiality protection is required, preferred, or not needed.

In an embodiment, wherein the transmitted communication request message is rejected by the second terminal in case that the one or more security policies included in the transmitted communication request message mismatch with one or more security policies associated with the second terminal.

In an embodiment, wherein the information on the one or more security policies is received from the core network entity during a service authorization and information provisioning procedure.

In accordance with an embodiment of the present disclosure, a method performed by a second terminal performing vehicle-to-everything (V2X) communication with a first terminal via one or more PC5 links in a wireless communication system is provided. The method may comprise: receiving, from a first terminal a direct communication request message including one or more security policies respectively corresponding to the one or more PC5 unicast links for initiating the V2X communication, wherein each of the one or more PC5 unicast links is associated with one or more V2X services; determining whether the received direct communication request message is acceptable based on the one or more security policies included in the transmitted communication message and one or more security policies associated with the second terminal; and in case that the transmitted direct communication request message is acceptable, activating a security of each of the one or more PC5 unicast links based on the received direct communication request message.

In an embodiment, wherein each of the one or more security policies included in the direct communication request message includes information associated with a first user plane integrity protection and information associated with a first user plane confidentiality protection, and wherein each of the one or more security policies associated with the second terminal includes information associated with a second user plane integrity protection and information associated with a second user plane confidentiality protection.

In an embodiment, wherein the received direct communication request message is rejected in case that the first user plane integrity protect is indicated to be not needed and the second user plane integrity protect is indicated to be required.

In an embodiment, wherein the received direct communication request message is rejected in case that the first user plane integrity protect is indicated to be required and the second user plane integrity protect is indicated to be not needed.

In an embodiment, wherein the received direct communication request message is rejected in case that the first user plane confidentiality protect is indicated to be not needed and the second user plane confidentiality protect is indicated to be required.

In an embodiment, wherein the received direct communication request message is rejected in case that the first user plane confidentiality protect is indicated to be required and the second user plane confidentiality protect is indicated to be not needed.

The embodiments disclosed herein can be implemented through at least one software program running on at least one hardware device and performing network management functions to control the elements. The elements shown in FIGS. 2, 3, and 4 may be at least one of a hardware device, or a combination of hardware device and software module.

The embodiments disclosed herein describe methods and systems for handling security policies in a V2X communication system. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method performed by a first terminal performing a communication with a second terminal in a wireless communication system, the method comprising:

receiving, from a core network entity, a first security policy related to PC5 unicast link for the first terminal during a service authorization and information provisioning procedure; and transmitting, to the second terminal, a direct communication request message including the first security policy, wherein the second terminal is associated with a second security policy, wherein the first security policy and the second security policy are associated with a rejection of the direct communication request message, and wherein the rejection of the direct communication request message is related to a discrepancy between the first security policy and the second security policy.

2. The method of claim 1, wherein the PC5 unicast link is associated with a vehicle-to-everything (V2X) service.

3. The method of claim 1, wherein the first security policy includes information associated with a first integrity protection set to one of required, preferred or not needed and information associated with a first confidentiality protection set to one of required, preferred or not needed, and wherein the second security policy includes information associated with a second integrity protection set to one of required, preferred or not needed and information associated with a second confidentiality protection set to one of required, preferred or not needed.

4. The method of claim 3, wherein the discrepancy occurs in case that the first integrity protection is set to not needed and the second integrity protection is set to required, or in case that the first integrity protection is set to required and the second integrity protection is set to not needed, or in case that the first confidentiality protection is set to not needed and the second confidentiality protection is set to required, or in case that the first confidentiality protection is set to required and the second confidentiality protection is set to not needed.

5. A first terminal performing a communication with a second terminal in a wireless communication system, the first terminal comprising:

at least one transceiver;

at least one processor communicatively coupled with the at least one transceiver; and at least one memory communicatively coupled with the at least one processor, storing instructions executable by the at least one processor to cause the first terminal to:

receive, from a core network entity, a first security policy related to PC5 unicast link for the first terminal during a service authorization and information provisioning procedure; and transmit, to the second terminal, a direct communication request message including the first security policy, wherein the second terminal is associated with a second security policy, wherein the first security policy and the second security policy are associated with a rejection of the direct communication request message, and wherein the rejection of the direct communication request message is related to a discrepancy between the first security policy and the second security policy.

6. The first terminal of claim 5, wherein the PC5 unicast link is associated with a vehicle-to-everything (V2X) service.

7. The first terminal of claim 5, wherein the first security policy includes information associated with a first integrity protection set to one of required, preferred or not needed and information associated with a first confidentiality protection set to one of required, preferred or not needed, and wherein the second security policy includes information associated with a second integrity protection set to one of required, preferred or not needed and information associated with a second confidentiality protection set to one of required, preferred or not needed.

8. The first terminal of claim 7, wherein the discrepancy occurs in case that the first integrity protection is set to not needed and the second integrity protection is set to required, or in case that the first integrity protection is set to required and the second integrity protection is set to not needed, or in case that the first confidentiality protection is set to not needed and the second confidentiality protection is set to required, or in case that the first confidentiality protection is set to required and the second confidentiality protection is set to not needed.

* * * * *